United States Patent
Uehara et al.

(10) Patent No.: US 6,965,323 B2
(45) Date of Patent: Nov. 15, 2005

(54) COMMUNAL VEHICLE SYSTEM

(75) Inventors: Takashi Uehara, Tokyo (JP);
Tomohide Shimizu, Iruma (JP);
Hiroshi Hamano, Tsurugashima (JP);
Mamoru Kokubu, Palm Spring (SG);
Yuji Uehara, Utsunomiya (JP);
Shunsuke Hayase, Utsunomiya (JP);
Michio Fujinuma, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/472,114

(22) PCT Filed: Mar. 20, 2002

(86) PCT No.: PCT/JP02/02655

§ 371 (c)(1),
(2), (4) Date: Apr. 2, 2004

(87) PCT Pub. No.: WO02/077946

PCT Pub. Date: Oct. 3, 2002

(65) Prior Publication Data

US 2005/0080752 A1    Apr. 14, 2005

(30) Foreign Application Priority Data

Mar. 21, 2001  (JP)  ............................. 2001-081382
Mar. 21, 2001  (JP)  ............................. 2001-081383

(51) Int. Cl.[7] .............................................. B60Q 1/48
(52) U.S. Cl. ................ 340/932.2; 340/904; 340/457.4; 340/992; 340/5.41; 705/4; 701/29; 701/35
(58) Field of Search ........................... 340/932.2, 928, 340/904, 457.4, 992, 5.42, 5.41, 5.5, 5.33; 705/4; 701/29, 35

(56) References Cited

U.S. PATENT DOCUMENTS 3,624,608 A * 11/1971 Altman et al. ............. 340/5.42
3,665,397 A *  5/1972 Di Napoli et al. ......... 340/5.42
5,206,643 A *  4/1993 Eckelt ..................... 340/932.2
5,812,070 A *  9/1998 Tagami et al. ........... 340/932.2

FOREIGN PATENT DOCUMENTS

CA        2032691      12/1989
DE    39 42 070 A1    12/1989

(Continued)

OTHER PUBLICATIONS

Standuhren et al,; "Raphael Melik-Minassiantz in Paris"; Osterreichisches Patentamt. Patentschrift Nr 138718; vol. 25, Apr. 15, 1934.

Primary Examiner—Jeffery Hofsass
Assistant Examiner—Daniel Previl
(74) Attorney, Agent, or Firm—Arent Fox, PLLC.

(57) ABSTRACT

In a motor vehicle sharing system for managing motor vehicles parked in a parking area and renting the motor vehicles to users, the motor vehicle is provided with a detector for detecting the start and end of motor vehicle rental, and a usage data measuring section for starting and completing measurements for motor vehicle usage data. The detector contains a position detector for detecting the parking area. The motor vehicle is further provided with a membership list in which user information is recorded, a charge list, a rentability judging section for judging whether the motor vehicle is rentable, and a charging data generating section for making charging data by referring to the motor vehicle usage data measured by the usage data measuring section and the charge list Thus, it is possible to perform the rental and return operation without relying on a control center.

25 Claims, 18 Drawing Sheets

FOREIGN PATENT DOCUMENTS

| | | |
|---|---|---|
| EP | 0 433 740 A2 | 12/1990 |
| JP | 55-116200 | 9/1980 |
| JP | 61-210497 | 9/1986 |
| JP | 4-305800 | 10/1992 |
| JP | 5-159143 | 6/1993 |
| JP | 10-261199 | 9/1998 |
| JP | 2000-293794 | 10/2000 |
| JP | 2001-357486 | 12/2001 |

* cited by examiner

COMMUNAL VEHICLE SYSTEM

CROSS-REFERENCE TO RELATED APPLICATION

This application is a National Stage entry of International Application No. PCT/JP02/02655, filed Mar. 20, 2002.

TECHNICAL FIELD

Present invention relates to a motor vehicle sharing system in which motor vehicles are used by a plurality of users. In particular, the present invention relates to a motor vehicle sharing system which is most preferable for a reliable rental and return operation of the vehicles.

BACKGROUND ART

Conventionally, in a motor vehicle sharing system, various ideas are proposed for purposes of efficient use of the motor vehicles by users so as to obtain transportation measures smoothly.

Among such proposals, a Patent Publication No. 3,064,615 discloses a technology for a motor vehicle rental system in which motor vehicles are used which are provided with communication measures for transmitting and receiving information which relate to a rental and return of the motor vehicle such as an identification information for identifying the user, a usage permission information for permitting for using the motor vehicle, and a usage information which indicate a usage condition of the motor vehicle. According the Patent Publication, a control center manages the motor vehicles by transmitting and receiving information which relates to the motor vehicle, a rental of the motor vehicle, and a return of the motor vehicles in a plurality of parking areas which are located in distant places from the control center.

In the above conventional motor vehicle control system, when a user pushes a return button which is disposed in the motor vehicle in a predetermined parking area, a usage information such as a used charge data is transmitted to the control center. However, the control center receives the usage information and judges in which parking area the motor vehicle is returned according to a position information which is contained in the usage information. The used charge is processed only when the parking area is identified as a designated parking area. Therefore, when a communication between the control center and the motor vehicle is disrupted, there are problems that it is not possible to process the used charge in the control center and the user cannot return the motor vehicle because a card is not returned.

The present invention is made in consideration of the above problems. An object of the present invention is to provide a motor vehicle sharing system in which a motor vehicle can perform a motor vehicle rental and return process independently without depending on the control center.

DISCLOSURE OF INVENTION

In order to solve the above problems, a motor vehicle sharing system according to the present invention for managing parked motor vehicles (for example, shared motor vehicle 2 in an embodiment) in the parking area and renting the motor vehicles to users is characterized in that the motor vehicle is provided with a detector for detecting a start of motor vehicle rental when a motor vehicle rental is permitted to a user and end of the motor vehicle rental, and an usage data measuring section for starting a measurement for a motor vehicle usage data when the detector detects a start of the motor vehicle rental and completing the measurement for the motor vehicle usage data when the detector detects an end of the motor vehicle rental.

By doing this, even when the control center cannot be operated because a communication between the shared motor vehicle and the control center for controlling the shared motor vehicle is disrupted, the shared motor vehicle judges the status of the rental such as a start of a rental or an end of a rental by a detector and obtain a motor vehicle usage data for controlling the rental and return of the motor vehicle.

According to a first aspect of the present invention, in a motor vehicle sharing system for managing parked motor vehicles and renting the motor vehicles to users, it is preferable that the detector includes a position detector for detecting a parking area, the usage data measuring section starts measuring the motor vehicle usage data when the usage data measuring section detects a departure of the position detector from the parking area, and the usage data measuring section completes measuring the motor vehicle usage data when the usage data measuring section detects an arrival of the position detector at the parking area (for example, steps S17 to S20, and steps S23 to S27 in a first embodiment).

By doing this, even when the control center cannot be operated because a communication between the shared motor vehicle and the control center for controlling the shared motor vehicle is disrupted, it is possible that the shared motor vehicle judges the status of the motor vehicle such as a departure of the motor vehicle from the parking area and a return of the motor vehicle at the parking area by the detector and obtains the motor vehicle usage data for controlling a rental and a return of the motor vehicle.

It is preferable that the motor vehicle is further provided with a communication confirming section (for example, a step S41 in an embodiment) for confirming whether or not it is possible to communicate to the control center when the usage data measuring section completes measuring the motor vehicle usage data, a temporary data storing and transmitting section (or example, a step S28 in an embodiment) for transmitting the motor vehicle usage data to the control center when the communication confirming section judges that it is possible to communicate with the control center, storing temporarily the motor vehicle usage data in an data storing section when the communication confirming section judges that it is not possible to communicate with the control center, and transmitting the motor vehicle usage data to the control center after it is possible to communicate with the control center.

By doing this, even when the control center cannot be operated because a communication between the shared motor vehicle and the control center for controlling the shared motor vehicle is disrupted, it is possible that the control center acknowledges the motor vehicle usage data for controlling the rental and the return of the motor vehicle because the shared motor vehicle stores the motor vehicle usage data which is obtained during a communication is disrupted in an information storing device temporarily and transmits all of the obtained motor vehicle usage data to the control center when a communication condition recovers thereafter.

It is preferable that the position detector contains a receiver (for example, a tag antenna 36 and an ID tag reader, and an ETC (Electronic Toll Collection) transmitting and receiving device in an embodiment) which receives a signal which is made in a signal generator (for example, an ID tag 52 and an ETC transmitting and receiving device) which is disposed in the parking area, and the position detector judges whether a motor vehicle departs the parking area or arrives at the parking area according to whether or not there is a signal arrived in the receiver.

By doing this, it is possible that the shared motor vehicle obtain an accurate parking position in the parking area.

It is preferable that the position detector judges whether a motor vehicle departs the parking area or arrives at the parking area according to a GPS (Global Positioning System).

By doing this, it is possible that the shared motor vehicle obtain a parking position in the parking area without disposing a new facilities in the parking area.

It is preferable that the control center performs calculation process for a used charge according to the motor vehicle usage data.

By doing this, it is possible that the control center can bill for a usage of the motor vehicle according to the usage condition of the motor vehicle accurately.

It is preferable that the motor vehicle usage data contains at least a usage time of the motor vehicle, a used fuel amount in the motor vehicle, and a driving distance of the motor vehicle.

By doing this, it is possible that the control center manages a motor vehicle rental operation according to various information.

According to a second aspect of the present invention, a motor vehicle sharing system for managing parked motor vehicles in the parking area and renting the motor vehicles to users is characterized in that the motor vehicle is further provided with a detector for detecting a start of a motor vehicle rental and an end of a motor vehicle rental when a motor vehicle rental is permitted to a user, a usage data measuring section (for example, steps S9 to step S16 in a second embodiment) which starts measuring the motor vehicle usage data when the usage data measuring section detects a departure of the position detector from the parking area and completes measuring the motor vehicle usage data when the usage data measuring section detects an arrival of the position detector at the parking area, a membership list (for example, a membership list 40 in a second embodiment) in which information of users who can use motor vehicle motors, a charge list (for example, a charge list 42 in a second embodiment) on which a relationship of the motor vehicle usage data which relates to a motor vehicle rental and return and the used charge for the motor vehicle is recorded, a rentability judging section (for example, steps S3 to S4 in a second embodiment) for judging whether or not the motor vehicle can be rented to the user by referring the information which is inputted by the user when the motor vehicle is rented to the records in the membership list, a charging data generating section (for example, steps S17 to S19 in a second embodiment) for making a charging data of the user by referring the motor vehicle usage data which is measured during the rental of the motor vehicle and the return of the motor vehicle by the usage data measuring section to the records in the charge list.

By doing this, the shared motor vehicle can judge a rentability of a motor vehicle to a user by referring an information which is inputted by the user to a membership list which is prepared in the shared motor vehicle when the shared motor vehicle is rented. Also, the shared motor vehicle can perform a motor vehicle rental and return processes by referring the motor vehicle usage data which is measured during the motor vehicle is used to a charge list which is prepared in the motor vehicle and calculating a used charge for the usage of the motor vehicle when the shared motor vehicle is returned.

It is preferable that, in a motor vehicle sharing system according to the present invention is characterized in further comprising a control center which transmits and receives a charging data with a vehicle. In this aspect of the present invention, it is characterized in that the motor vehicle is provided with a transmitter (for example, a step S22 in a second embodiment) which transmits a charging data to the control center, and the control center is provided with a charge billing section (or example, a step S26 in a second embodiment) which calculates a used charge according to the charging data for a predetermined period and bills the used charge to the user.

By doing this, the control center can perform a billing process by the accurate motor vehicle usage data which is calculated by the shared motor vehicle according to the charging data which is calculated by the shared motor vehicle.

It is preferable that the control center has a master membership list which contains a latest data of users who can use motor vehicles, and the motor vehicle obtains the master membership list from the control center every time the user uses the motor vehicle and updates the membership list.

By doing this, it is possible to provide a motor vehicle rental business service based on a latest membership information.

It is preferable that the control center has the master membership list (for example, a membership list 12 in an embodiment) which contains a latest data of users who can use motor vehicles, and the motor vehicle obtains the master membership list from the control center periodically and updates the membership list.

By doing this, it is possible to provide a motor vehicle rental business service based on a latest membership information while restricting a communication processes for obtaining the membership list.

It is preferable that the control center has the master membership list (for example, a membership list 12 in an embodiment) which contains a latest data of users who can use motor vehicles, and the motor vehicle obtains the master membership list from the control center and updates the membership list when an information which is inputted by the user is not recorded in the membership list.

By doing this, it is possible to provide a motor vehicle rental business service based on a latest membership information while restricting a communication processes for obtaining the membership list in a minimum level.

It is preferable that, the motor vehicle further comprises a position detector (for example, a tag antenna 36 and an ID tag reader 37 in an embodiment) for detecting a parking area. In this aspect of the present invention, it is preferable that the usage data measuring section starts measuring the motor vehicle usage data when a departure of the position detector from the parking area is detected, and the usage data measuring section completes measuring the motor vehicle usage data when an arrival of the position detector at the parking area is detected.

By doing this, the shared motor vehicle can judge a status of the motor vehicle and obtain a motor vehicle usage data even when a communication between the shared motor vehicle and the control center is disrupted.

It is preferable that the motor vehicle usage data contains at least a usage time of the motor vehicle, a used fuel amount of the motor vehicle, or a driving distance of the motor vehicle.

By doing this, the control center can manage a motor vehicle rental operation according to various information.

BEST MODE FOR CARRYING OUT THE INVENTION

Embodiments of the present invention are explained with reference to drawings as follows.

Figure 1:
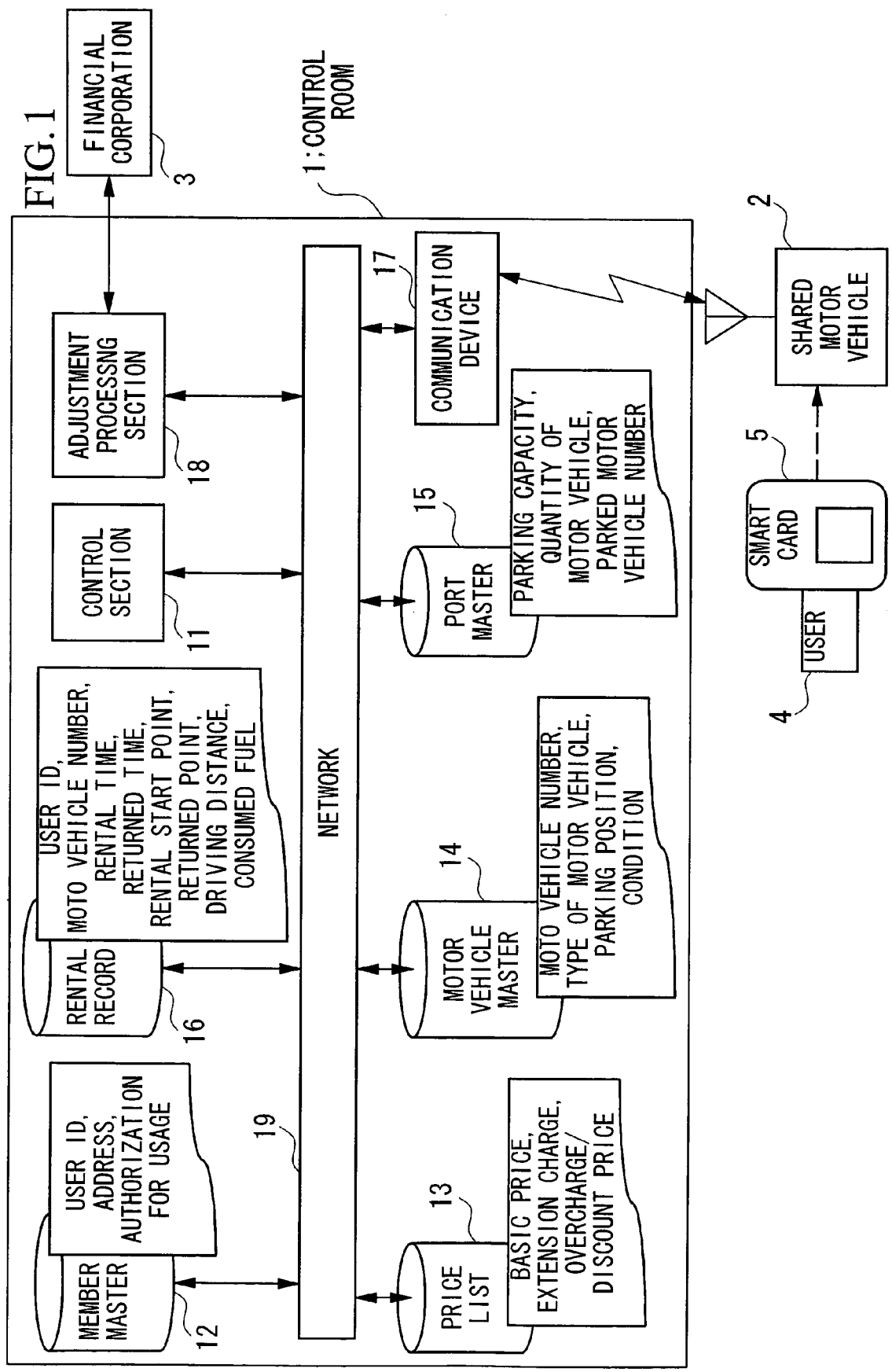
FIG. 1 is a block diagram for a first embodiment of the present invention.

FIG. 1 is a block diagram for a first embodiment of the present invention.

In FIG. 1, a control center 1 is a control center which manages various operations such as a reservation and an allocation of the shared motor vehicle 2 which is used by a user in common and a billing operation of a used charge for a share use of motor vehicles which are parked in a parking area which is called a port. Reference numeral 3 indicates a financial corporation such as a bank and a credit cart company for adjusting the used charge of the motor vehicle usage by the user. Also, a reference numeral 2 indicates a shared motor vehicle which can be used by using a smart card 5 which is owned by a user 4 who is registered as a membership in the control center.

Here, it is understood that a plurality of the shared motor vehicles 2 are controlled under the control center 1. Also, it is understood that whatever numbers of the user 4 may exist.

Also, the control center comprises a control section 11, a membership master 12, a charge list 13, a motor vehicle master 14, a port master 15, a rental record 16, a communication device 17, an adjustment processing section 18, and a network 19. The control section 11 performs a motor vehicle management control program in a computer system which is provided with a CPU (Central Processing Unit) so as to control an overall operation of the control center. Here, a detailed operation in the control section 11 is explained later.

The membership master 12 is a database which records a registered data for a user who is registered as a membership. In this database, information regarding (1) a user ID, (2) address, and (3) an information for a membership are recorded.

The charge list 13 is a database in which a pricing system for the usage of the shared motor vehicle is recorded. In the charge list 13, information such as (1) a base price (2) an extended price, and (3) overcharge·discount charge price are recorded.

The motor vehicle master 14 is a database in which information regarding each shared motor vehicle is recorded for controlling the shared motor vehicle 2. For example, an information for each motor vehicle such as (1) a motor vehicle number, (2) motor vehicle type, (3) a parking position (parking port), and (4) condition are recorded.

The port master 15 is a database in which a condition regarding a port is recorded for controlling the shared motor vehicle 2. In the port master 15, for example, an information such as (1) a number of motor vehicle which are parked in the parking area, (2) a number of motor vehicle which are registered as the motor vehicle, and (3) parked motor vehicle number are recorded.

The rental record 16 is a database in which a usage record of the shared motor vehicle 2 is recorded. In the rental record 16, for example, an information regarding each user 4 such as (1) a user ID, (2) a rented motor vehicle number, (3) time of motor vehicle rental, (4) time of motor vehicle return, (5) departure place, (6) return place, (7) a driving distance, and (8) a used fuel are recorded.

The communication device 17 is an interface section for transmitting and receiving an information regarding a shared motor vehicle 2 and a rental and return of the motor vehicle such as a motor vehicle control data by the control center. Here, the motor vehicle control data is transmitted and received between the control center 1 and the shared motor vehicle 2 by a wireless communication via communication device (which is not shown in the drawing) which is disposed in each port.

The adjusting section 18 records a motor vehicle usage price and its total price per a plurality of log which is separated for billed party such as an account for a plurality of financial corporations per each user, or a plurality of accounts for a financial corporation. The adjusting section 18 adjusts the billed price by these financial corporation 3.

The network 19 is a communication network which forms a LAN (Loca Area Network) for connecting the above control section 11, the mambership master 12, the charge list 13, the motor vehicle master 14, the port master 15, the rental record 16, the communication device 17, and the adjustment processing section 18 in the control center so as to transmit and receive data therebetween.

Next, a shared motor vehicle 2 which is used in the present embodiment is explained with reference to drawings.

Figure 2:
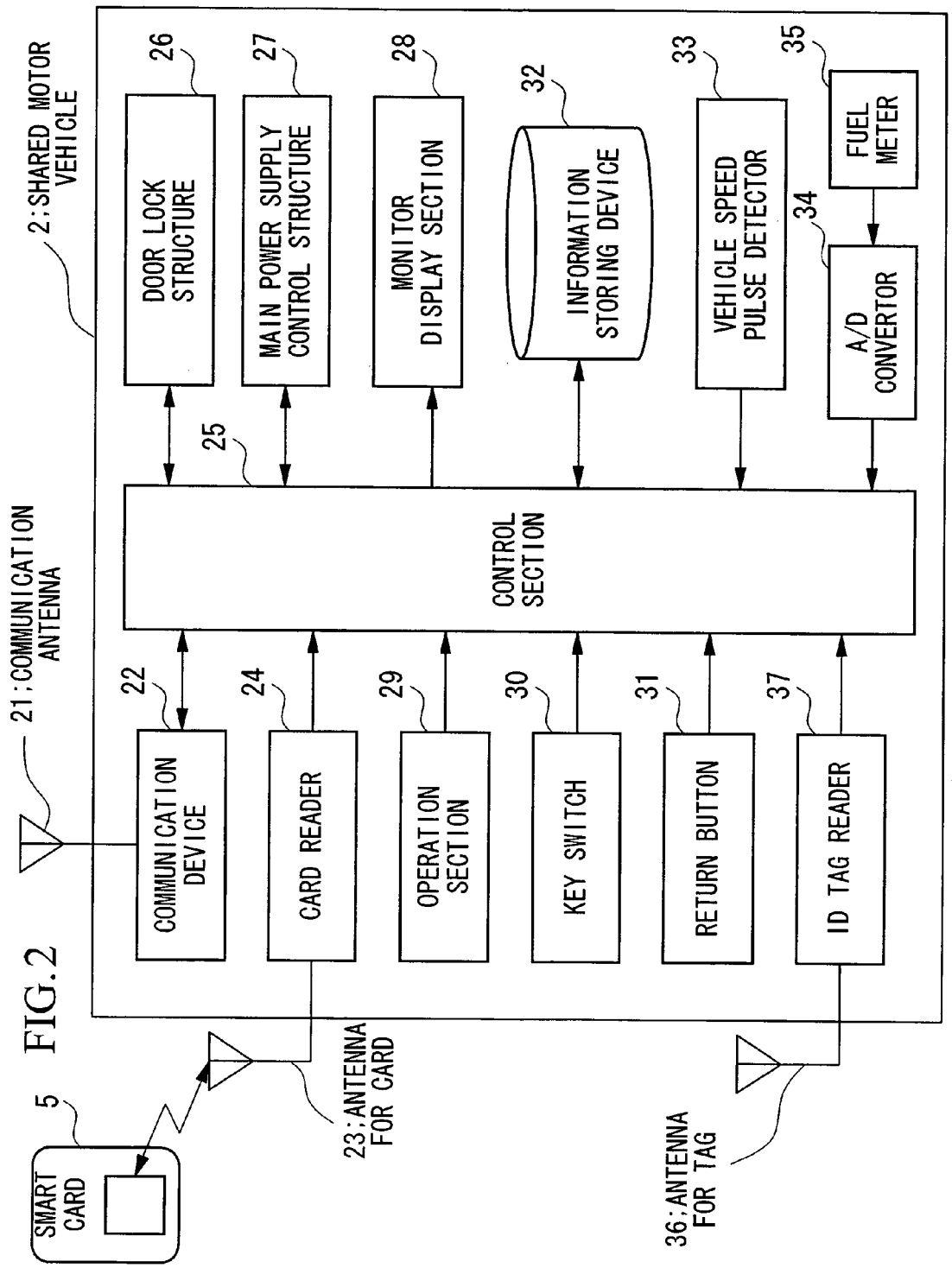
FIG. 2 is a view for a structure in a shared motor vehicle which is used in the first embodiment according to the present invention.

FIG. 2 is a block diagram showing a structure in the shared motor vehicle 2. In FIG. 2, the shared motor vehicle 2 comprises a communication antenna 21, a communication device 22, an antenna 23 for a card, a card reader 24, a control section 25, a door lock structure 26, a main power supply control section 27, a monitor display section 28, an operation section 29, a key switch 30, a return button 31, an information storing device 32, a vehicle speed pulse detector 33, an A/D converter 34, a fuel meter 35, an antenna 36 for a tag, and an ID tag reader 37.

The shared motor vehicle 2 is parked in a parking area which is called as a lot for a motor vehicle in the parking area. The control center performs a wireless communication with a communication device (not shown in the drawing) which is disposed in each port via the communication device 22 which is connected to the communication antenna 21 so as to exchange various data.

The shared motor vehicle 2 notifies a signal which is read out by the card reader 24 to the control section 25 which controls an operation of the shared motor vehicle 2 when the user 4 holds up, for example, a non-contacting readable and rewritable smart card 5 such that the antenna 23 for a card which is disposed in the shared motor vehicle 2 can read out information stored in the smart card 5.

The control section 25 performs a wireless communication with the communication device (not shown in the drawing) which is disposed in each port via the communication device 22 and the communication antenna 21. Consequently, when the user 4 holds up the smart card 5, the shared motor vehicle 2 transmits an information that the user 4 request for using the shared motor vehicle 2 to the control center 1 so as to request a permission for a rental of the motor vehicle.

Also, the information storing device 32 is made of a ROM (Read Only Memory) and a RAM (Random Access Memory). The information storing device 32 stores an ID number of the motor vehicle which is allocated to the shared motor vehicle 2 in advance and stores an ID number of the user which is inputted by the user and a PIN (Personal Identification Number) temporarily. When the control section 25 transmits the ID number of the motor vehicle which is stored in the information storing device 32 and the ID number of the user which is inputted by the user to the control center, a permission of the rental of the shared motor vehicle 2 is issued to the user. Consequently, a door lock structure 26 opens a door key according to an instruction from the control center which receives a request of a rental of the motor vehicle. Also, when it is confirmed that the PIN which is inputted by the user coincides in the PIN which is stored in the information storing device 32 in the control section 25, the main power supply control section 27 permits a use of an ignition circuit.

The user 4 inputs a necessary items according to instructions which are displayed on the monitor display section 28 from the operation section 29 to the control section 25 when the shared motor vehicle 2 is rented. Consequently, the user 4 pushes the key switch 30 so as to turn on an ignition of the shared motor vehicle 2; thus, the user 4 starts a rental of the shared motor vehicle 2. Also, the user pushes the return button 31 in the port so as to perform a returning operation when the shared motor vehicle 2 is returned to the port.

Here, the above smart cart 5 is an ID terminal in which a recorded ID number can be read out and rewritten. Also, the smart cart 5 is provided with an IC (Integrated Circuit) which contains a processor which can determine a simple judging operation in the smart card independently. In the present embodiment, the ID terminal which is used for notifying the ID number to the shared motor vehicle 2 is not limited to an IC card which is non-contacting readout and rewritable IC card or a contacting readout and rewritable IC card as long as a readout device which is disposed in the shared motor vehicle 2 can handle the data in the ID terminal. That is, any ID terminal such as a magnetic card, and a mobile phone which is provided with an IC chip thereinside can be used for the ID terminal as long as the ID number which is stored thereinside can be read out and rewritten.

Also, during the shared motor vehicle 2 is driving, a motor vehicle speed pulse signal which indicates a driving condition of the shared motor vehicle 2 is notified from the vehicle speed pulse detector 33 to the control section 25. Furthermore, the fuel meter 35 is connected to the control section 25 via the A/D converter 34; thus, the control section 25 can acknowledge a consumption of the fuel according to the motor vehicle speed pulse signal which indicates a driving condition of the shared motor vehicle 2.

Here, the detail of the operation for renting the shared motor vehicle 2 by the user is explained later.

Figure 3:
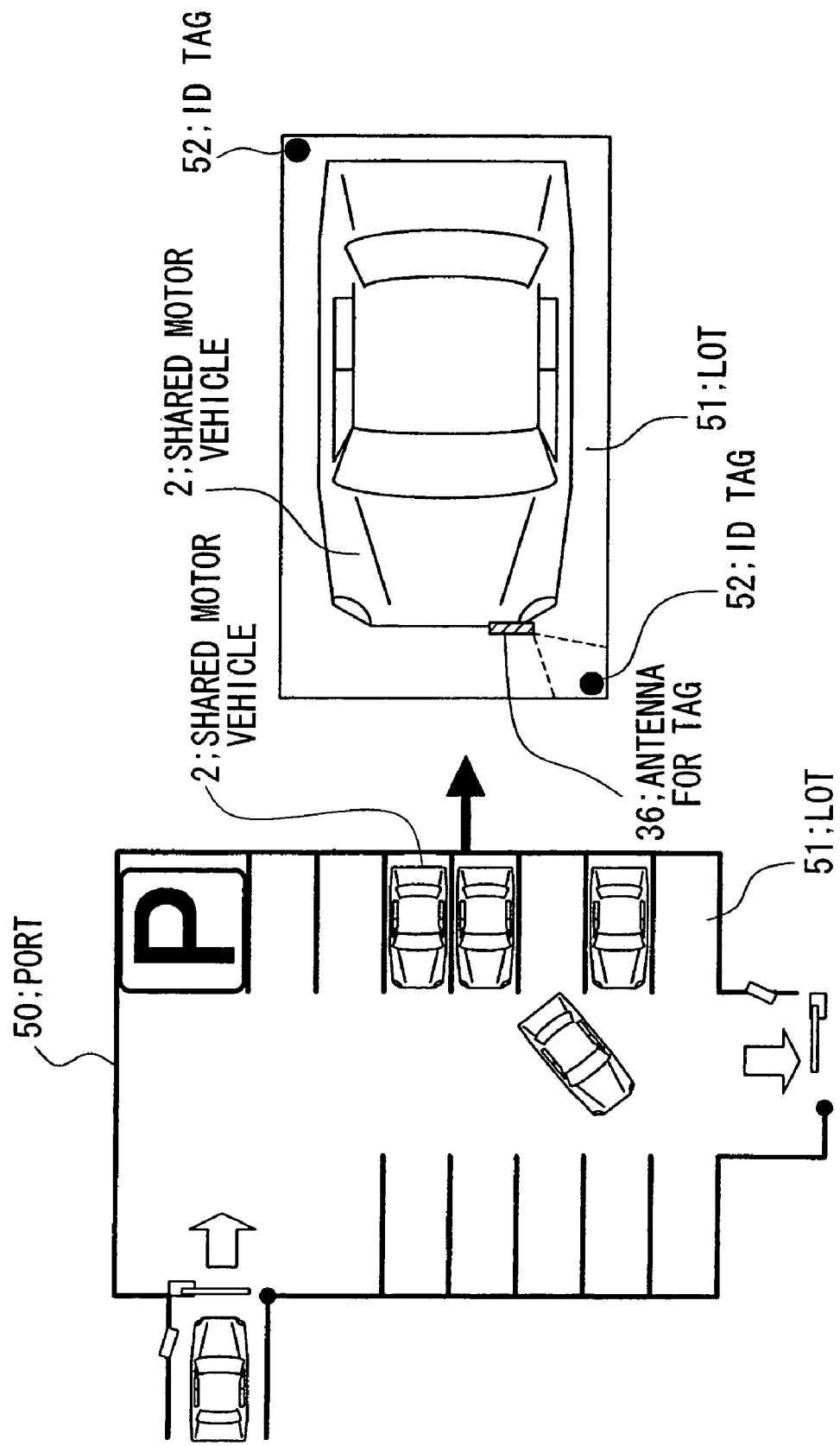
FIG. 3 show a port for parking a shared motor vehicle which is used in embodiments according to the present invention.
Figure 4:
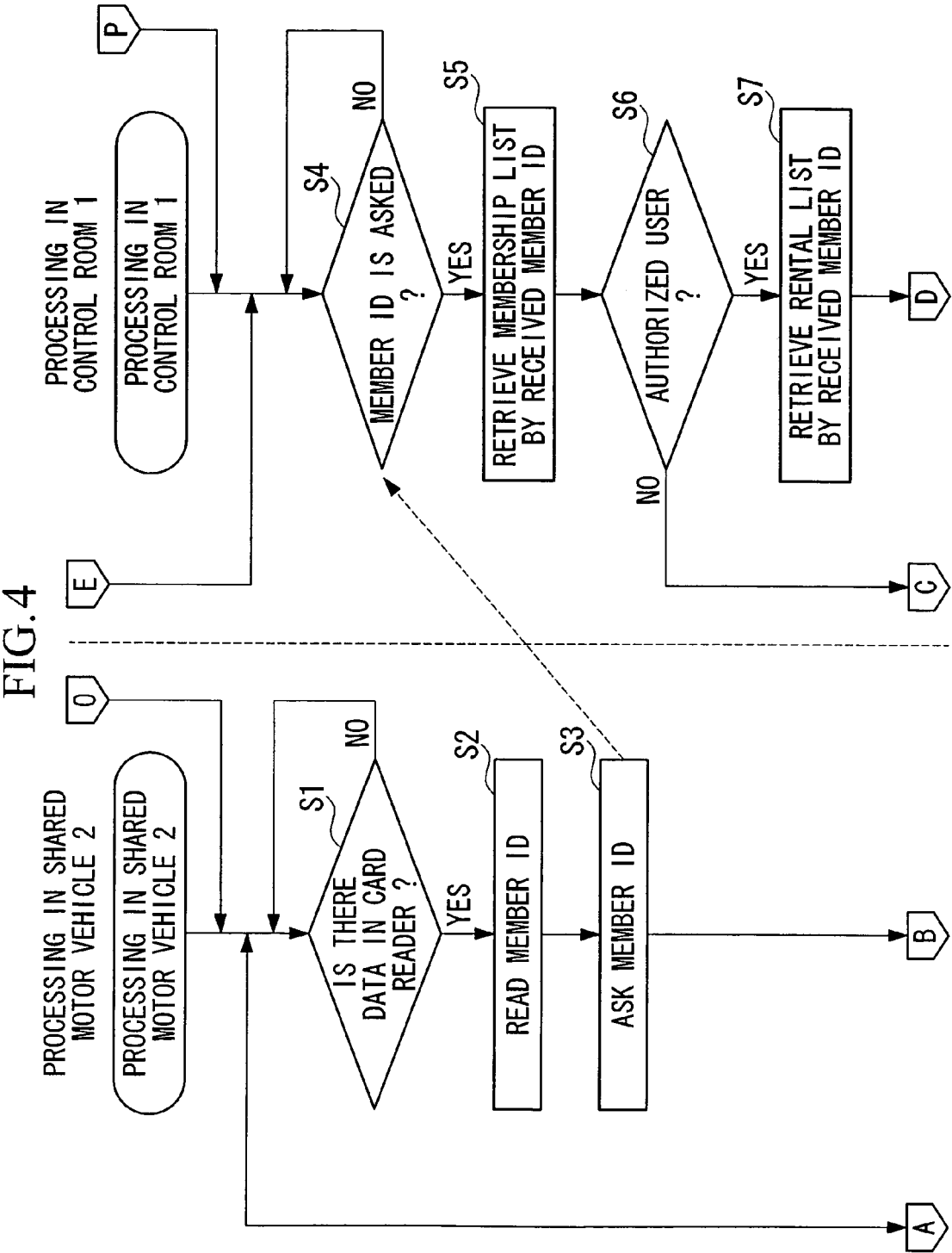
FIG. 4 show an entire operation in a motor vehicle sharing system according to the first embodiment of the present invention.
Figure 5:
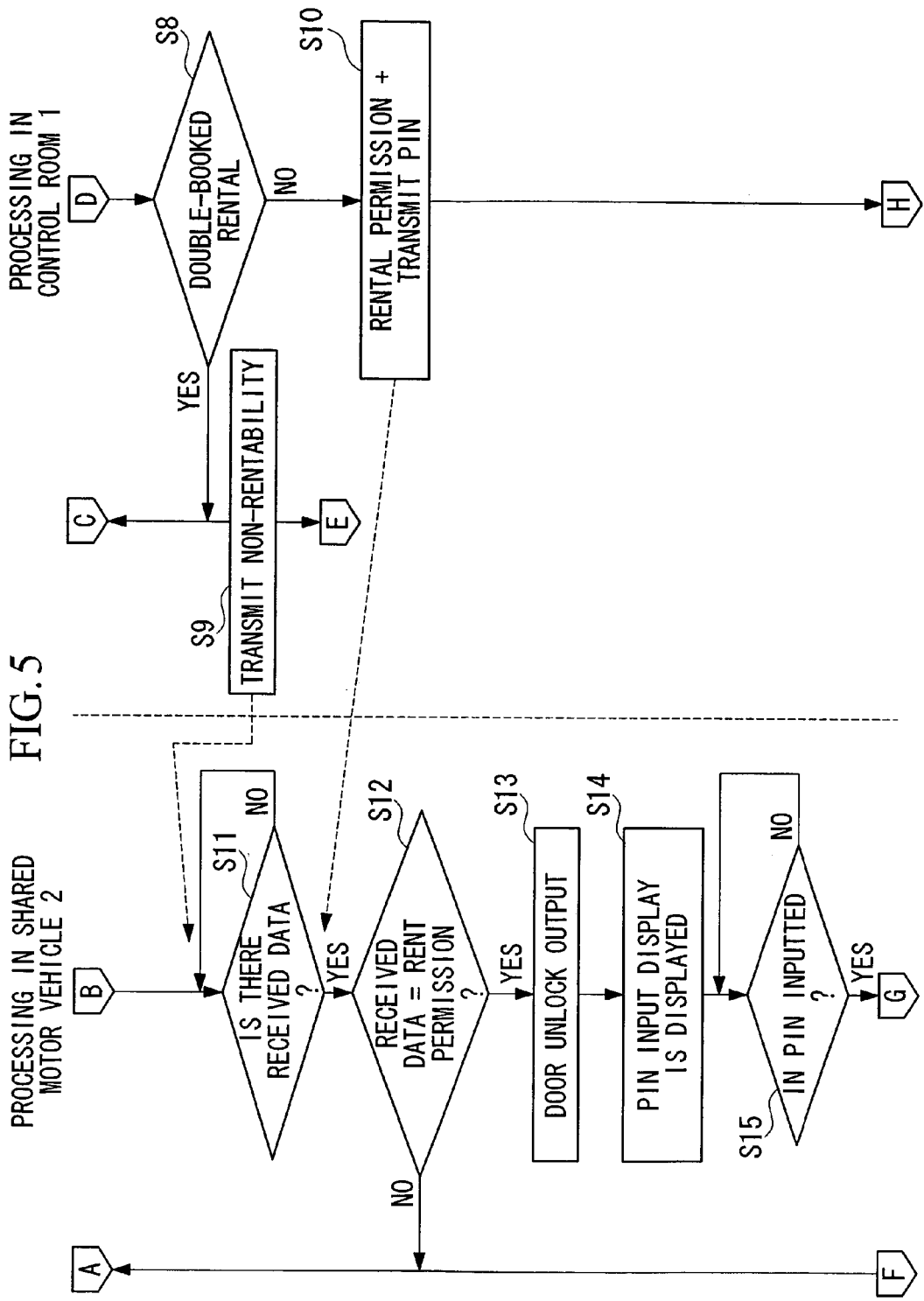
FIG. 5 shows an entire operation in a motor vehicle sharing system according to the first embodiment.
Figure 6:
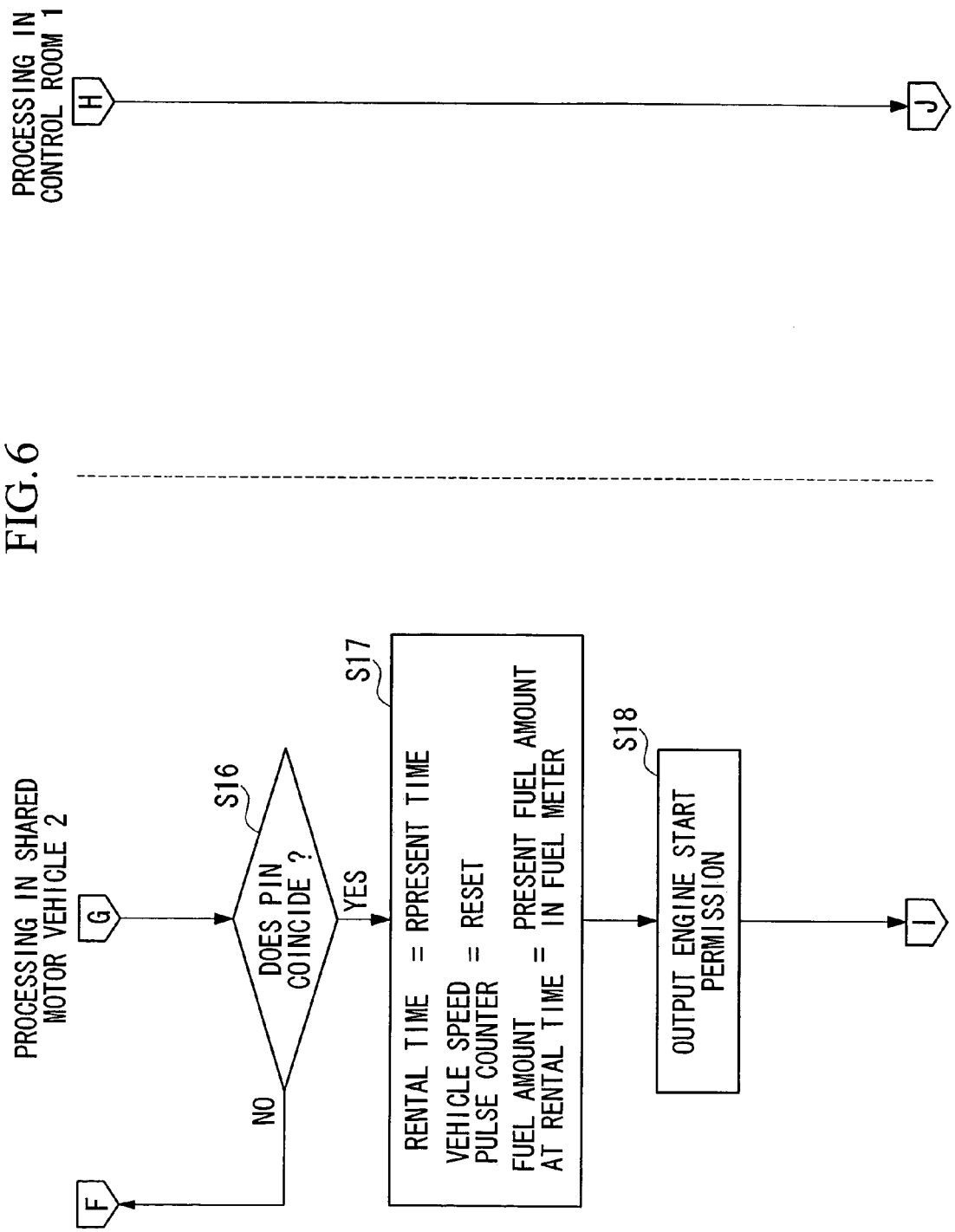
FIG. 6 shows an entire operation in a motor vehicle sharing system according to the first embodiment.
Figure 7:
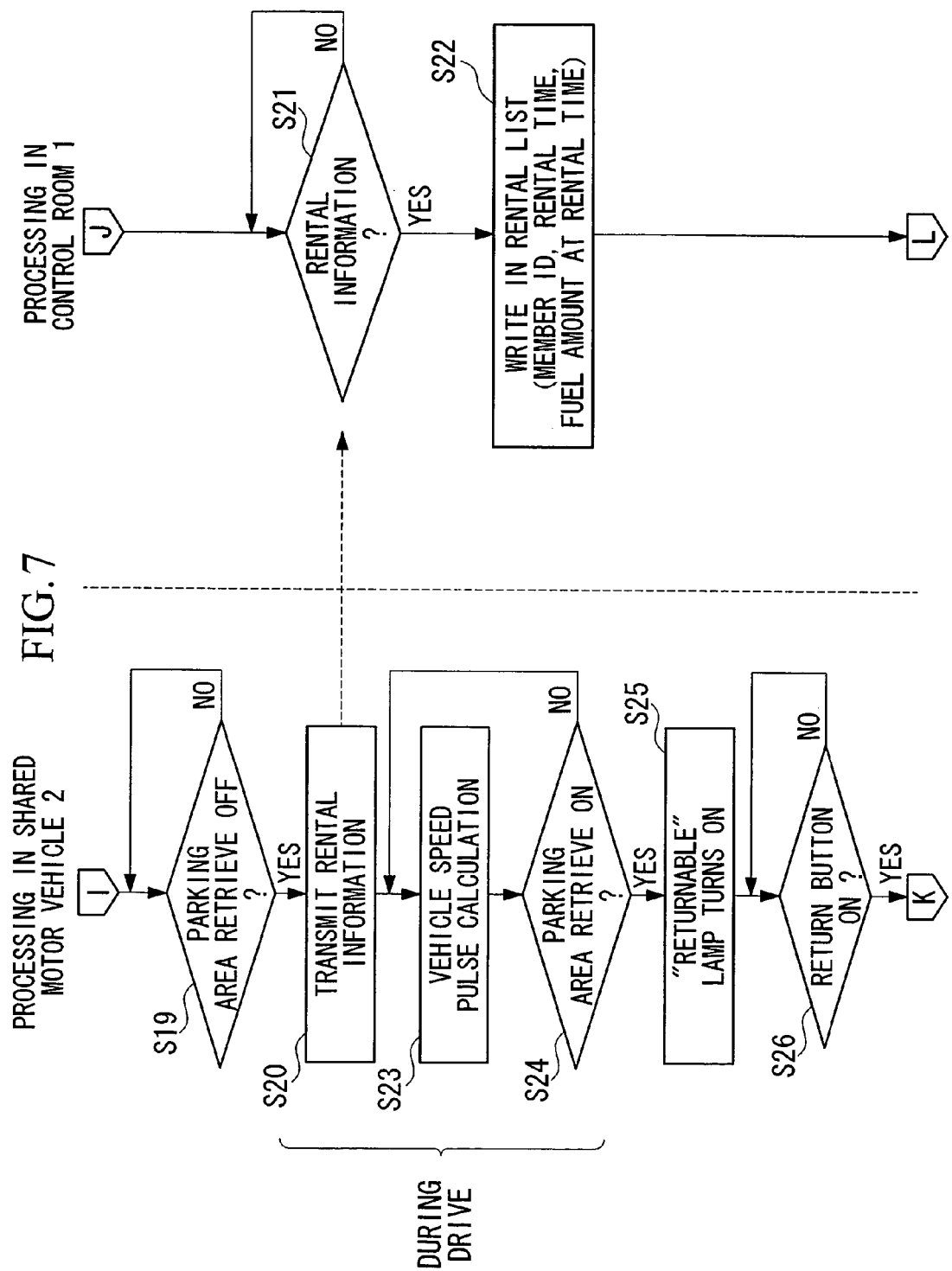
FIG. 7 shows an entire operation in a motor vehicle sharing system according to the first embodiment.
Figure 8:
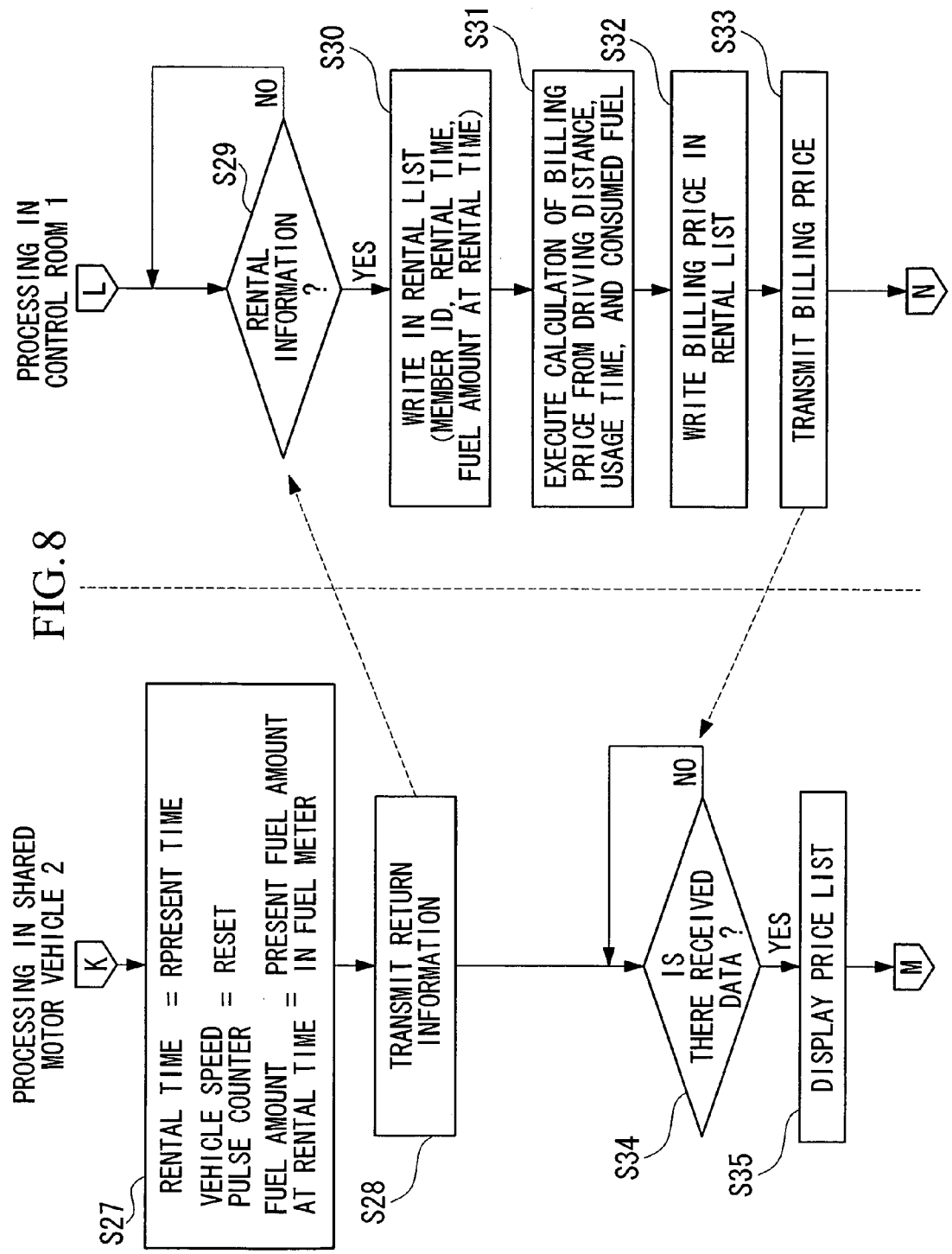
FIG. 8 shows an entire operation in a motor vehicle sharing system according to the first embodiment.
Figure 9:
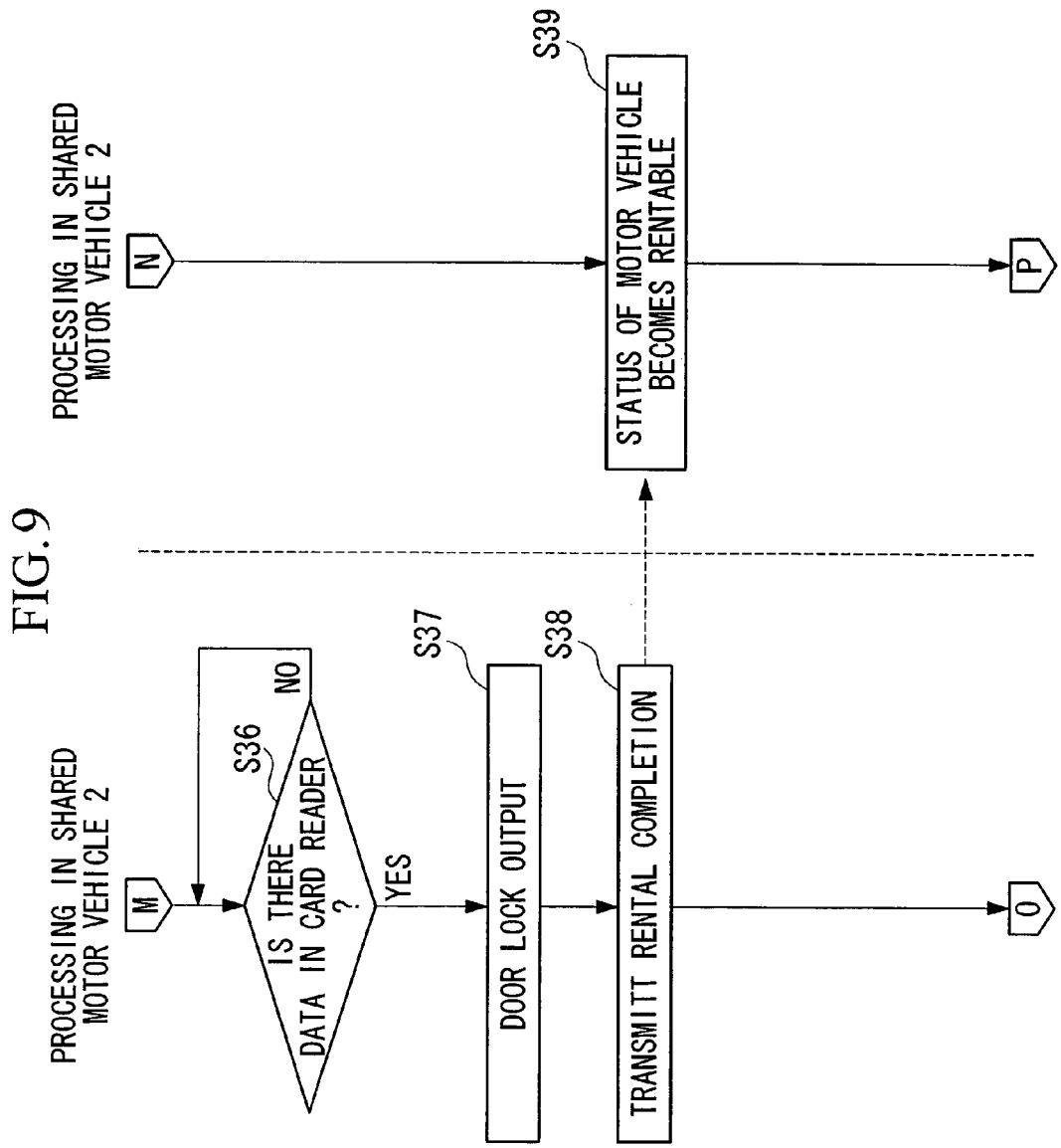
FIG. 9 shows an entire operation in a motor vehicle sharing system according to the first embodiment.

Also, the antenna 36 for a tag and the ID tag reader 37 are devices such that the shared motor vehicle 2 which is parked in the port may distinguish the lot in the port. The tag is explained with reference to FIG. 3. As shown in FIG. 3, a plurality of lots 51 are disposed in the port 50 so as to park the shared motor vehicle 2. In each lot 51, an ID tag 52 is disposed so as to send an ID number which is allocated to each of the port 50 and the lot 51.

ID tag 52 exchanges an original ID number per the port 50 and the lot 51 with the antenna 36 for a tag according to either method such as an electromagnetic coupling method, electromagnetic inducing method, microwave method, electrostatic coupling method, and optical transmitting method. The shared motor vehicle 2 acknowledges a position of the port or the lot where the shared motor vehicle 2 is parked by reading the signal which is received by the antenna 36 for a tag by the ID tag reader 37. Here, as shown in FIG. 3, two pieces of the ID tags 52 are disposed diagonally in the lot 51 so as to serve as a front wheel stop and a rear wheel stop respectively. The antenna 36 for a tag is disposed in either of a front corner or a rear corner which is closer to the ID tag 52 (left front position in FIG. 3).

Also, a structure for acknowledging the positions of the port and the lot where the shared motor vehicle 2 is parked can be not only an ID tag 52 but also a transmitting and receiving device which is used in the ETC (Electronic Toll Collection) system and a position detection section which uses a GPS (Global Positioning System).

Next, an operation in the motor vehicle sharing system according to the present embodiment is explained with reference to the drawings.

FIGS. 4, 5, 6, 7, 8, and 9 are flow charts showing an entire processes in the motor vehicle sharing system.

The user 4 who is registered as a membership in the control center owns a smart card 5; thus, the user 4 uses the shared motor vehicle 2.

The control section 25 in the shared motor vehicle 2 judges whether or not there is a data in the card reader 24 (step S1) so as to know whether or not the master card 5 which is owned by the user 4 accesses the shared motor vehicle 2. After that, the control section 25 awaits the access of the user 4 by the smart card 5 to the shared motor vehicle 2 (NO in step S1).

In the step S1, when the user 4 accesses the shared motor vehicle 2 by the smart card 5 (YES in step S1), the control section 25 in the shared motor vehicle 2 reads out the membership ID which is recorded in the smart card 5 by the card reader 24 (step S2) and inquires to the control center (step S3) via the communication device 22 and the communication antenna 21.

On the other hand, the control section 11 in the control center 1 judges whether or not an inquiry for the membership ID comes (step S4) and awaits an inquiry for the membership ID coming from the shared motor vehicle 2 (NO in step S4).

In the step S4, when the inquiry for the membership ID comes from the shared motor vehicle 2 (YES in step S4), the control section 11 in the control center 1 searches the membership list in the membership master 12 according to the received membership ID (step S5) and judges whether or not the inquired membership ID is a membership ID for an authorized user (step S6).

In the step S6, when the inquired membership ID is a membership ID for the authorized user (YES in the step S6), the rental list which is recorded in the rental list 16 is searched according to the received membership ID (step S7); thus, whether or not the rental is a double-booked rental is judged (step S8).

Also, in the step S6, when the inquired membership ID is not a membership ID for the authorized user (NO in the step S6), or when the rental is a double-booked rental (YES in the step S8) because the inquired membership ID is double-booked, the control section 11 in the control center 1 transmits a prohibition of the rental (step S9) to the shared motor vehicle 2 via the communication device 17; thus, the rental of the shared motor vehicle 2 is not performed.

On the other hand, in the step S8, when the inquired membership ID is not double-booked, (NO in the step S8), the control section 11 in the control center 1 transmits the permission of the rental and the PIN to the shared motor vehicle 2 via the communication device 17 (step S10).

In the step S3, the control section 25 in the shared motor vehicle 2 which inquires the membership ID judges whether or not there is a data which is received from the communication device 22 (step S11) and awaits that the control center 1 receives a signal which relates to the rental (NO in the step S11).

In the step S11, when there is a data which is received from the communication device 22 (YES in the step S11), the control section 25 in the shared motor vehicle 2 judges whether or not the received data indicates rentable (step S12).

In the step S12, when the received data does not indicate the permission of the rental (NO in the step S12), the flow chart returns to the step S1 and repeats the above operations.

Also, in the step S12, when the received data indicates the permission of the rental (YES in the step S12), the control section 25 in the shared motor vehicle 2 outputs a door unlock signal to the door lock structure 26 (step S13) and displays a PIN input screen on the monitor display section 28 (step S14).

Next, the control section in the shared motor vehicle 2 judges whether or not the PIN is inputted (step S15) and awaits until the PIN is inputted (NO in the step 15).

In the step S15, when the user 4 input the PIN by the operation section 29 (YES in the step S15), the inputted PIN is given to the user 4 in advance. In the step S10, whether or not the PIN which is given to the user in advance coincide with the PIN which is transmitted from the control center 1 is judged (step S16).

In the step S16, when the inputted PIN is given to the user 4 in advance, and the PIN which is given to the user 4 in advance does not coincide with the PIN which is transmitted from the control center 1 in the step S10 (NO in the step S16), the flow chart returns to the step S1 and the above operation is repeated.

Also, in the step S16, when the inputted PIN is given to the user 4 in advance and the inputted PIN which is given to the user 4 in advance coincides with the PIN which is transmitted from the control center 1 in the step S10 (YES in the step S16), the rental time, the vehicle speed pulse counter, and the fuel amount at the rented time are set (step S17). Here, condition is such as "rental time=present time", "vehicle speed counter= reset", and "fuel at rented time=present value in the fuel meter".

After each item is set, the control section 25 in the shared motor vehicle 2 outputs an engine start permission signal to the main power supply control section 27 (step S18).

Next, the control section 25 in the shared motor vehicle 2 judges whether or not a parking area detection by the antenna 36 for a tag and the ID tag reader 37 is turned off by is turned off (step S19) so as to know whether or not the user 4 turns on the ignition in the shared motor vehicle 2 and starts using the shared motor vehicle 2 (step S19), and awaits that the shared motor vehicle 2 departs the lot 51 in the port 50 in the departing place such that the ID tag cannot be detected (NO in the step S19).

In the step S19, when the shared motor vehicle 2 departs the lot 51 in the port 50 in the departing place and the ID tag cannot be detected, the parking area detection by the antenna 36 for a tag and the ID tag reader 37 is turned off (YES in the step S19), and the control section 25 in the shared motor vehicle 2 transmits an rental information to the control center 1 via the the communication device 22 and the communication antenna 21 (step S20). Here, the rental information indicates a rental time and the fuel amount at the rented time.

On the other hand, in the step S10, the control section 11 which transmits the permission of the rental and the PIN to the shared motor vehicle 2 in the control center 1 judges whether or not the rental information is transmitted from the shared motor vehicle 2 (step S21) and awaits until the rental information is transmitted from the shared motor vehicle 2 (NO in the step of S21).

In the step S21, when the rental information is transmitted from the shared motor vehicle 2 (YES in the step S21), the control section 11 in the control center 1 writes the membership ID of the user 4 who rents the shared motor vehicle 2, a rental time of the shared motor vehicle 2, and a fuel amount at the rented time in the rental list which is recorded in the rental record 16 (step S22).

Also, during the shared motor vehicle 2 is driving, the vehicle speed pulse is always notified to the control section 25 in the shared motor vehicle 2 by the vehicle speed pulse detector 33, and the control section 25 calculates the vehicle speed pulse and measures the driving distance of the shared motor vehicle 2 (step S23).

Next, the control section 25 in the shared motor vehicle 2 judges whether or not the parking area detection by the antenna 36 for a tag and the ID tag reader 37 is turned on (step S24) so as to know whether or not the shared motor vehicle 2 arrives at the lot 51 in the port 50 in a destination place, and awaits until the shared motor vehicle 2 arrives at the lot 51 in the port 50 in the destination place and the ID tag 52 can be detected (NO in the step S24).

In the step S24, when the shared motor vehicle 2 arrives at the lot 51 in the port 50 in the destination place and the ID tag can be detected, the parking area detection by the antenna 36 for a tag and the ID tag reader 37 is turned on (YES in the step S24), and the control section 25 in the shared motor vehicle 2 turns on a lamp which indicates "returnable" in the return button 31 (step S25).

Consequently, whether or not the return button 31 is turned on is judged (step S26). Consequently, in this step, it is awaited that the user 4 turns on the return button 31 so as to return the shared motor vehicle 2 (NO in the step of S26).

In the step S26, when the user 4 pushes the return button 31 so as to return the shared motor vehicle 2 (YES in the step S26), the control section 25 in the shared motor vehicle 2 sets the rented time, the vehicle speed pulse counter, and the fuel amount at the returned time (step S27). Here, condition is such as "returned time=present time", "vehicle speed counter= reset", and "fuel at returned time=present value in the fuel meter".

After completing the settings for each item, the control section 25 in the shared motor vehicle 2 transmits the return information to the control center 1 via the communication device 22 and the communication antenna 21 (step S28). Here, the return information indicates the returned time, the driving distance, and the fuel amount at the returned time.

On the other hand, in the step S22, the control section 11 which writes the membership ID of the user 4 who rents the shared motor vehicle 2, a rental time of the shared motor vehicle 2, and the fuel amount at the rented time in the rental list which is recorded in the rental record 16 in the control center 1 judges whether or not the return information is transmitted from the shared motor vehicle 2 (step S29) and awaits until the return information is transmitted from the shared motor vehicle 2 (NO in the step of S29).

In the step S29, when the return information is transmitted from the shared motor vehicle 2 (YES in the step S29), the control section 11 in the control center 1 writes the membership ID of the user 4 who returns the shared motor vehicle 2, the returned time of the shared motor vehicle 2, driving distance, and the fuel amount at the returned time in the rental list which is recorded in the rental record 16 (step S30).

Consequently, the used charge is calculated according to the driving distance, the usage time, and the used fuel amount (step S31), and the calculated used charge is recorded in a space for records of the designated user 4 in the rental list which is recorded in the rental record 16 (step S32).

Also, in the step S28, the control section 25 in the control center 1 transmits the used charge to the shared motor vehicle 2 via the communication device 17 (step S33).

On the other hand, in the step S28, the control section 25 which transmits the return information to the control center 1 in the shared motor vehicle 2 judges whether or not there is a received data from the communication device 22 (step S34) and awaits until the signal which relates to the price is received from the control center 1 (NO in the step of S34).

In the step S34, when there is a received data from the communication device 22 (YES in the step S34), the control section 25 in the shared motor vehicle 2 displays the received price data in the monitor display section 28 (step S35).

Next, the control section 25 in the shared motor vehicle 2 judges whether or not there is a data in the card reader 24 so as to judge whether or not the user 4 is accessing the shared motor vehicle 2 by the smart card 5 (step S36) and awaits until the user 4 leaves from the shared motor vehicle 2 with the smart card 5 (YES in the step S36).

In the step S36, when the user 4 leaves from the shared motor vehicle 2 with the smart card 5 (NO in the step of S36), the control section 25 in the shared motor vehicle 2 outputs the door lock signal to the door lock structure 26 (step S37) and transmits the return completion signal to the control center 1 via the communication device 22 and the communication antenna 21 (step S38).

The control section 11 which receives the return completion signal from the shared motor vehicle 2 in the control center 1 sets the condition of the motor vehicle to be retable (step S39).

After that, the shared motor vehicle 2 and the control center 1 return to the first step (step S1 for the shared motor vehicle 2, and the step S4 for the control center 1), and the above operation is repeated.

Here, in the above step S28, when the return information is transmitted from the shared motor vehicle 2 to the control center 1, the control section 25 in the shared motor vehicle 2 starts a timer and locks the door after a predetermined period of time even if the door lock signal is not outputted in the step S37. Furthermore, if it is impossible to lock the door even if the door lock operation is performed, the control section 25 in the shared motor vehicle 2 request that a staff personnel should be dispatched to the place where the door cannot be locked. The used charge is adjusted in a bank account in the financial corporation 3 which is designated per each user according to the record in the rental record 16 via the adjustment processing section 18 when the user performs the returning operation.

Next, other embodiment of the present invention is explained with reference to the drawings.

Figure 10:
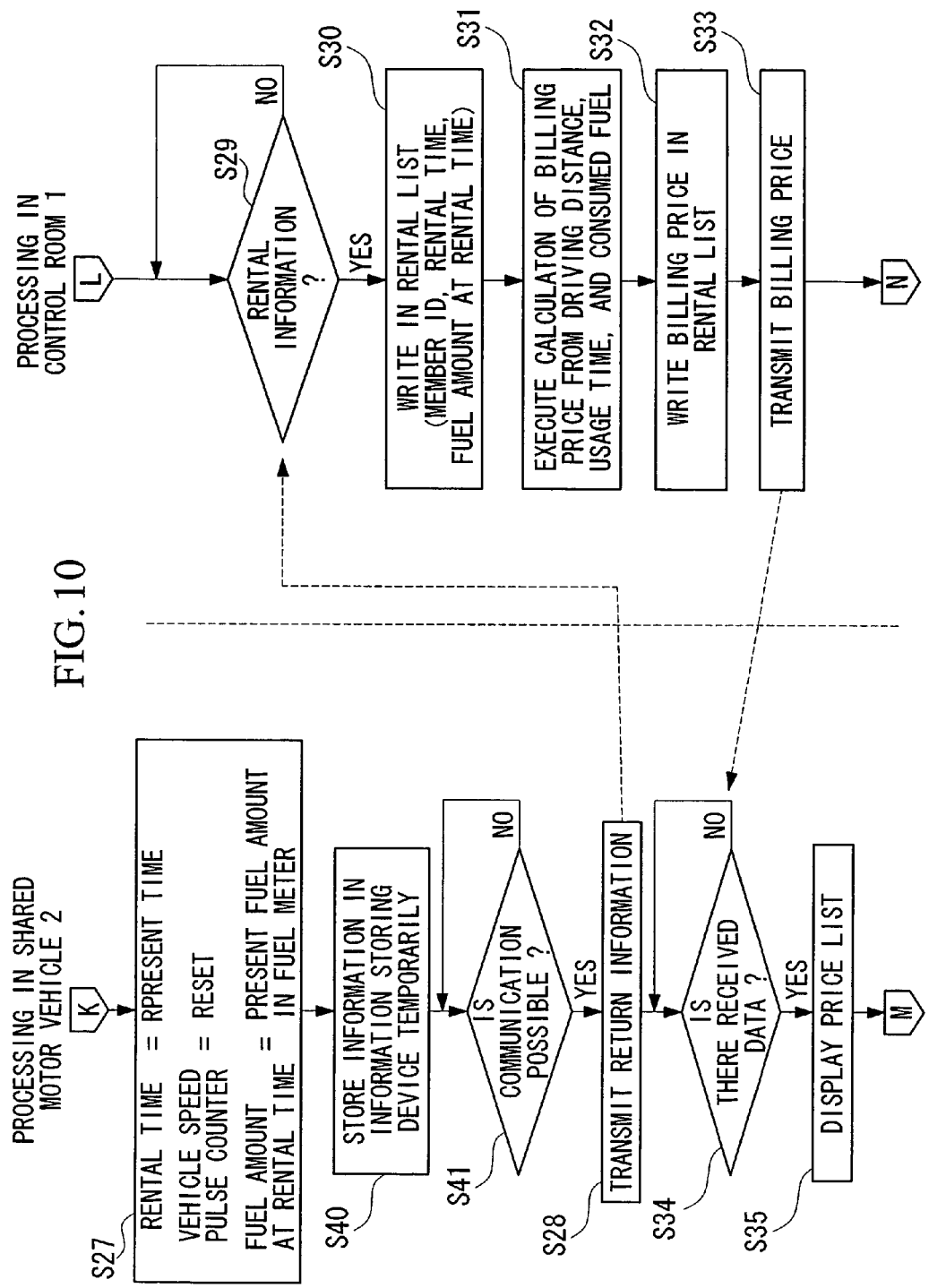
FIG. 10 shows operations in a motor vehicle sharing system in other example of the embodiment.

FIG. 10 is a flow chart for showing the operations in a motor vehicle sharing system in other example of the embodiment. FIG. 10 explains an equivalent sections in the above embodiment shown in FIG. 8. FIG. 10 is different from FIG. 8 in the operations from the step S27 to the step S34. The other steps before steps S27 and the steps after the steps S35 are the same; therefore, the explanations for the same operations are omitted.

In a different embodiment shown in FIG. 10, in the step S27, the control section 25 in the shared motor vehicle 2 sets the return time, the vehicle speed pulse counter, and the fuel amount at the returned time, and after that, the control section 25 in the shared motor vehicle 2 stores each item in the information storing device 32 temporarily (step S40).

Next, the control section 25 in the shared motor vehicle 2 judges whether or not it is possible to communicate with the control center 1 via the communication device 22 and the communication antenna 21 (step S41) and awaits, if communication is impossible, until it is possible to communicate with the control center 1 (NO in the step of S40).

In the step S41, if it is possible to communicate with the control center 1 via the communication device 22 and the communication antenna 21 (YES in the step S41), the return information is transmitted to the control center 1 (step S28). Here, the return information indicates the return time, the driving distance, and the fuel amount at the returned time.

On the other hand, in the step S22, the control section 11 which writes the membership ID of the user 4 who rents the shared motor vehicle 2, the rental time of the shared motor vehicle 2, and the fuel amount at the rented time in the rental list which is recorded in the rental record 16 in the control center 1 judges whether or not the return information is transmitted from the shared motor vehicle 2 (NO in the step S29) and awaits until the return information is transmitted from the shared motor vehicle 2 (NO in the step of S29).

In the step S29, when the return information is transmitted from the shared motor vehicle 2 (YES in the step S29), the control section 11 in the control center 1 writes the membership ID of the user 4 who returns the shared motor vehicle 2, the returned time of the shared motor vehicle 2, driving distance, and the fuel amount at the returned time in the rental list which is recorded in the rental record 16 (step S30).

Consequently, the used charge is calculated according to the driving distance, the usage time, and the used fuel amount (step S31), and the calculated used charge is recorded in a space for records of the designated user 4 in the rental list which is recorded in the rental record 16 (step S32).

Also, in the step S28, the control section 25 in the control center 1 transmits the used charge to the shared motor vehicle 2 via the communication device 17 (step S33).

On the other hand, in the step S28, the control section 25 which transmits the return information to the control center 1 in the shared motor vehicle 2 judges whether or not there is a received data from the communication device 22 (step S34) and awaits until the signal which relates to the price is received from the control center 1 (NO in the step of S34).

In the step S34, when there is a received data from the communication device 22 (YES in the step S34), the control section 25 in the shared motor vehicle 2 displays the received price data in the monitor display section 28 (step S35).

Next, a second embodiment of the present invention is explained with reference to FIGS. 11 to 18. Hereinafter, the same reference numerals are applied to corresponding members as shown in the first embodiment so as to omit the repeated explanation thereof.

Figure 11:
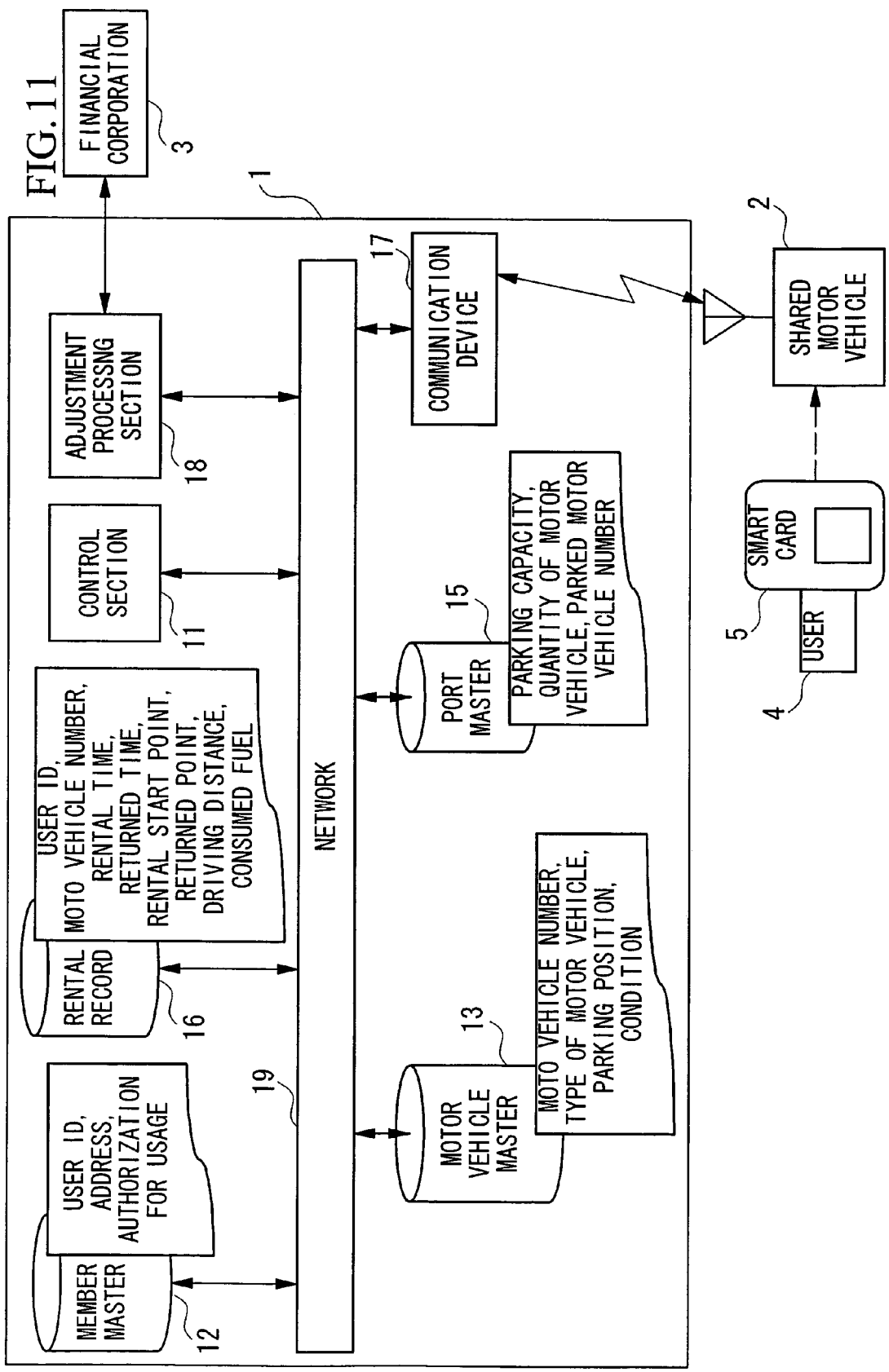
FIG. 11 is a block diagram for a second embodiment of the present invention.

FIG. 11 is a block diagram showing structure in the second embodiment. FIG. 11 shows an equivalent structure to that in the FIG. 1 for explaining the first embodiment. FIG. 11 is different from FIG. 1 in that a charge list 13 is disposed in the shared motor vehicle 2 as explained later and the control center 1 does not have the charge list 13.

Figure 12:
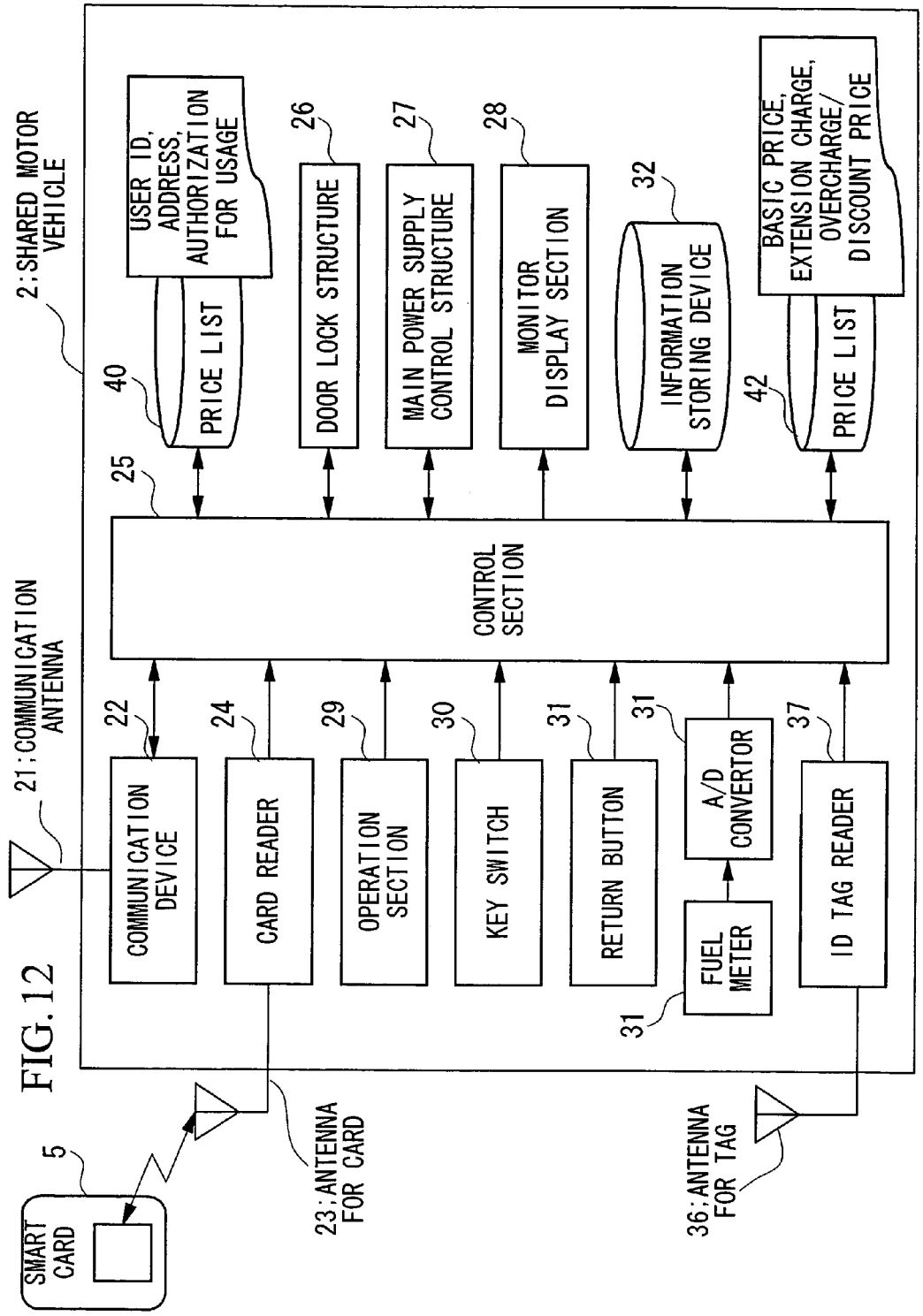
FIG. 12 is a view for a structure in a shared motor vehicle which is used in the first embodiment according to the present invention.
Figure 13:
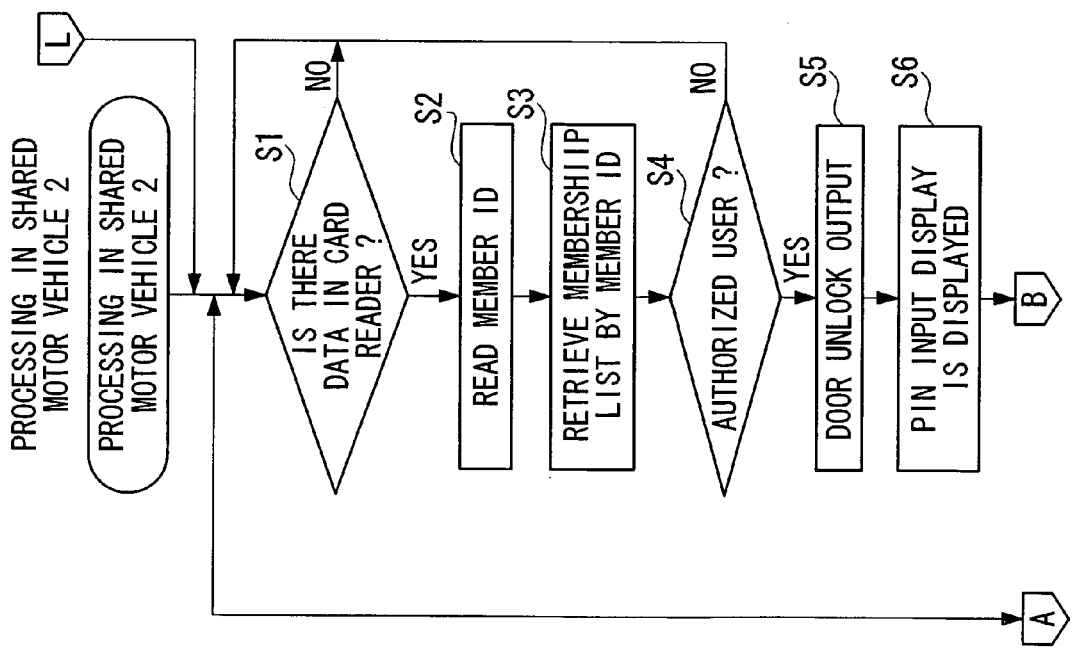
FIG. 13 show an entire operation in a motor vehicle sharing system according to the first embodiment of the present invention.
Figure 14:
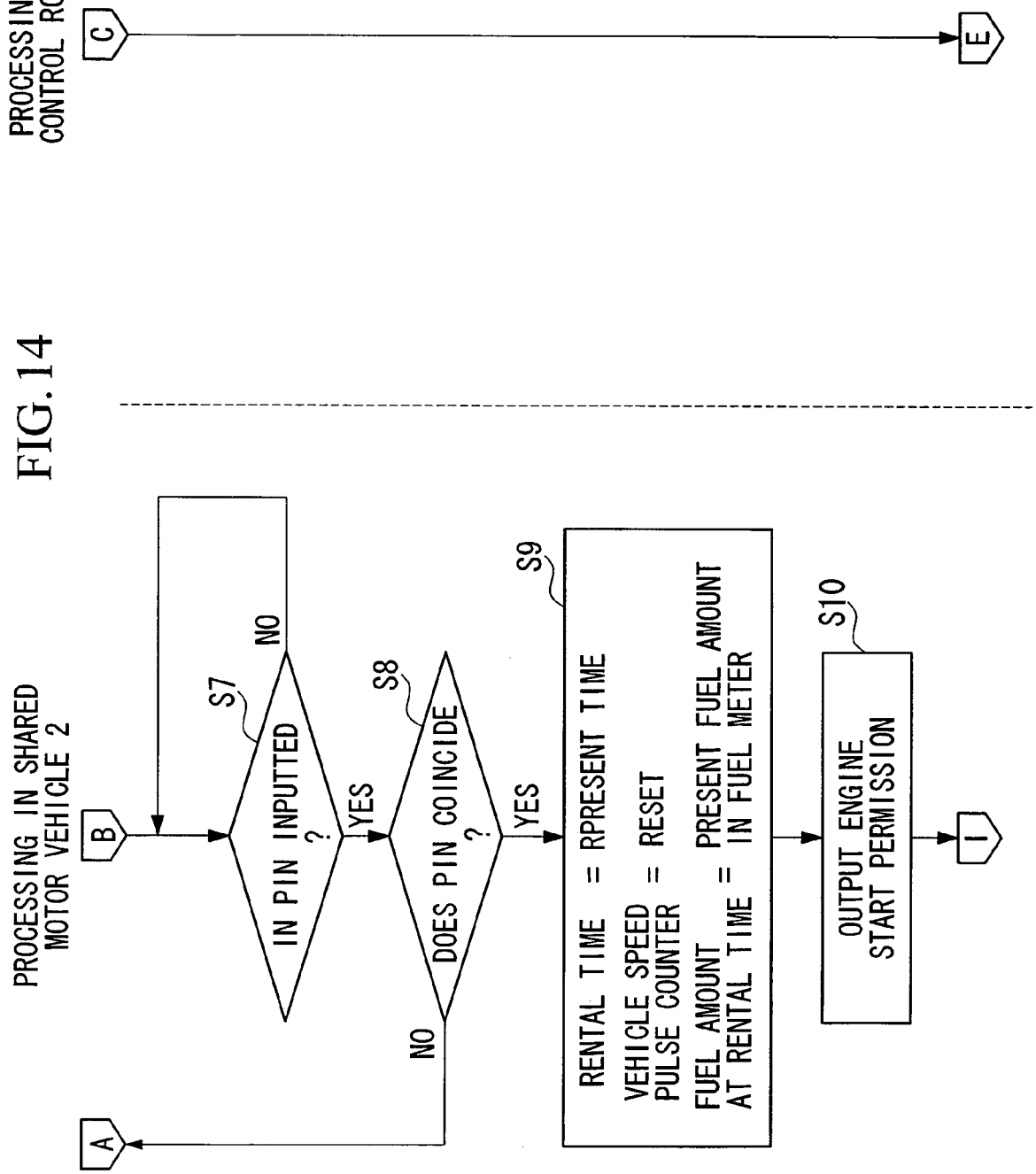
FIG. 14 show an entire operation in a motor vehicle sharing system according to the first embodiment of the present invention.
Figure 15:
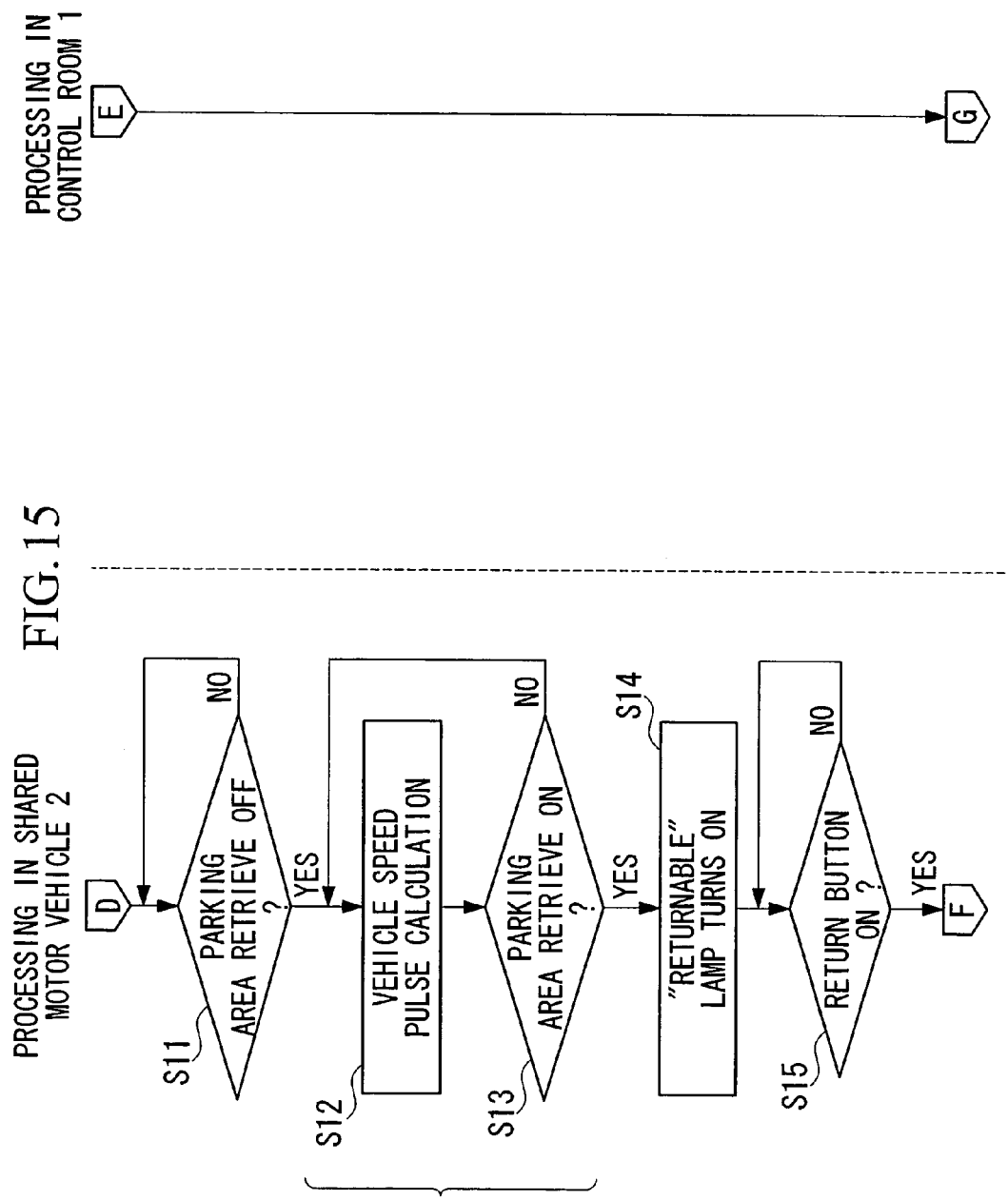
FIG. 15 show an entire operation in a motor vehicle sharing system according to the first embodiment of the present invention.
Figure 16:
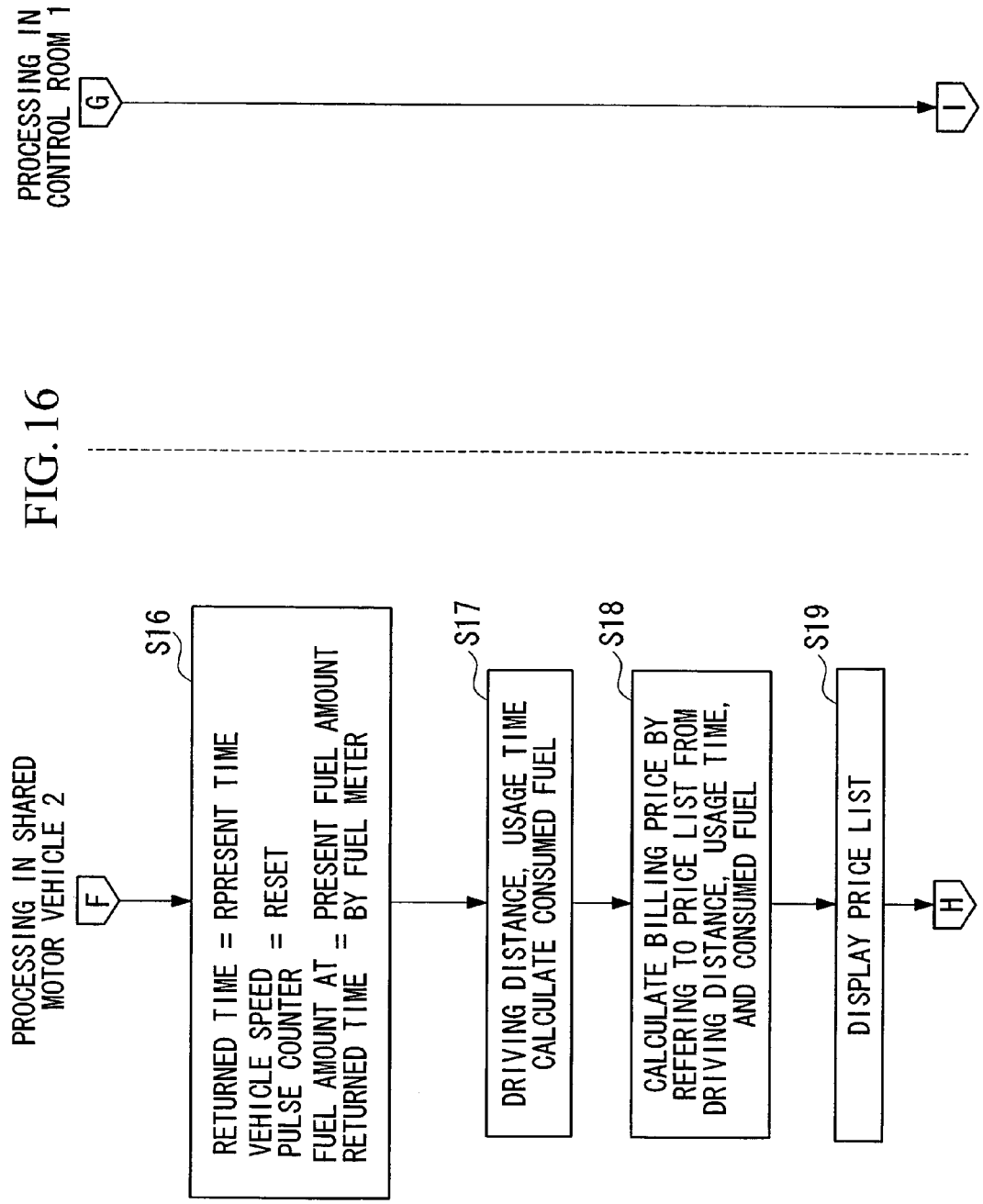
FIG. 16 show an entire operation in a motor vehicle sharing system according to the first embodiment of the present invention.
Figure 17:
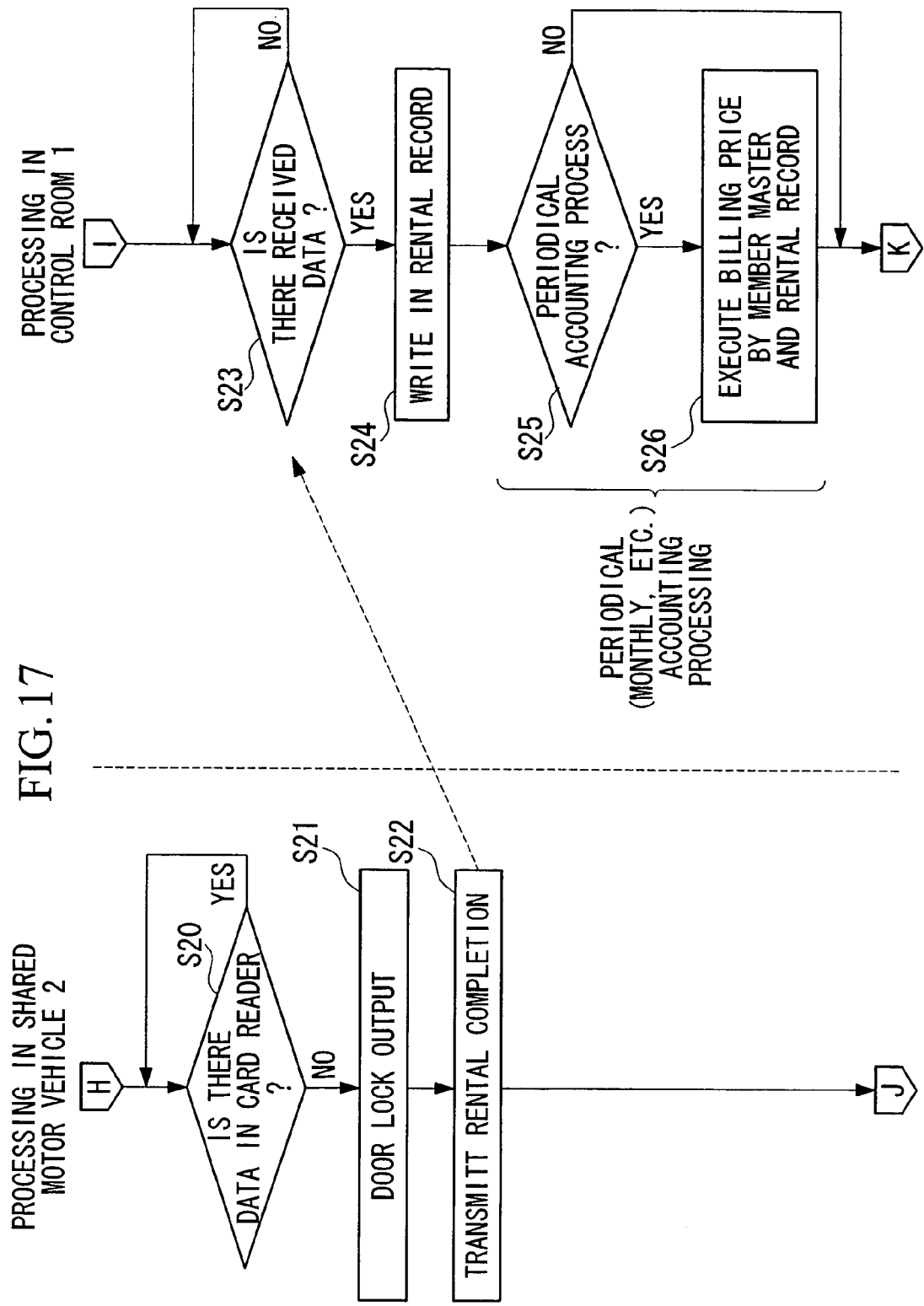
FIG. 17 show an entire operation in a motor vehicle sharing system according to the first embodiment of the present invention.
Figure 18:
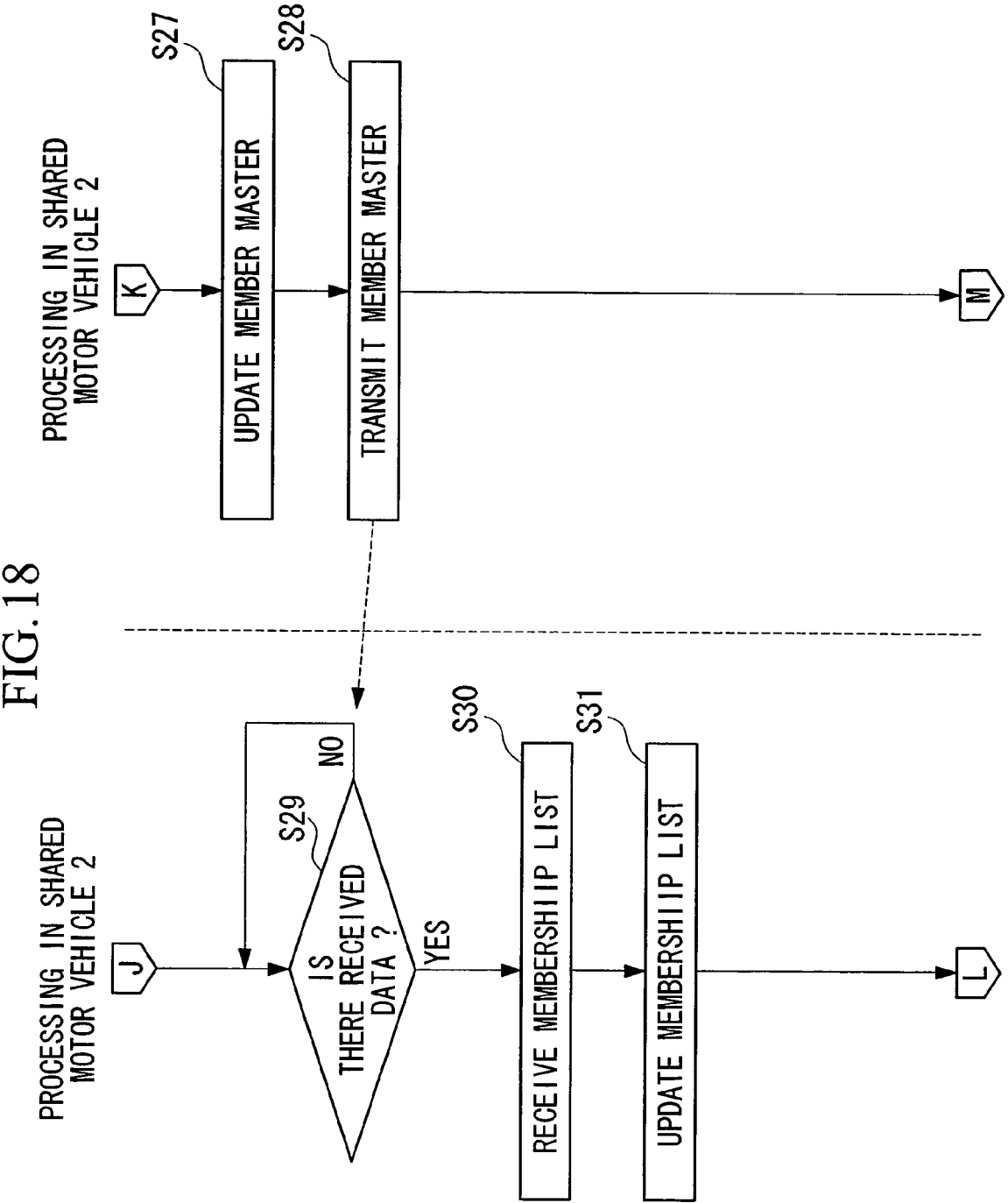
FIG. 18 show an entire operation in a motor vehicle sharing system according to the first embodiment of the present invention.

FIG. 12 is a block diagram showing structure of the shared motor vehicle 2 in the present embodiment. FIG. 12 shows an equivalent structure to that in the FIG. 2 for explaining the first embodiment. FIG. 12 is different from FIG. 2 in that the shared motor vehicle 2 has the membership list 40 and the charge list 42.

The shared motor vehicle 2 notifies a signal which is read out by the card reader 24 to the control section 25 which controls an operation of the shared motor vehicle 2 when the user 4 holds up, for example, a non-contacting readable and rewritable smart card 5 such that the antenna 23 for a card which is disposed in the shared motor vehicle 2 can read out information stored in the smart card 5.

The membership list 40 which is a copy of the membership master 12 in which a registration data of the user who is registered as a membership in the control center 1 and membership information such as (1) user ID, (2) address, (3) membership are recorded. The control section 25 refers the record in the membership list to the signal which is read by the card reader 24 and judges whether or not the motor vehicle is rented. Here, the record in the membership list 40 is compared to the record in the membership master 12 periodically; thus, the contents of the record are updated.

Also, when a permission for the rental of the shared motor vehicle 2 is given to the user, the door lock structure 26 opens the door key such that the main power supply control section 27 can use the ignition circuit.

In the present embodiment, following features are the same as those in the first embodiment such that the user 4 inputs a necessary items according to instructions which are displayed on the monitor display section 28 from the operation section 29 to the control section 25 when the shared motor vehicle 2 is rented. Consequently, the user 4 pushes the key switch 30 so as to turn on an ignition of the shared motor vehicle 2; thus, the user 4 starts a rental of the shared motor vehicle 2. Also, the user pushes the return button 31 in the port so as to perform a returning operation when the shared motor vehicle 2 is returned to the port.

A charge list 42 is a database in which a pricing system for the usage of the shared motor vehicle 2 is recorded. In the charge list 42, information such as such as (1) a base price (2) an extended price, and (3) overcharge-discount charge price are recorded.

During the shared motor vehicle 2 is driving, the motor vehicle speed pulse signal which indicates a driving condition of the shared motor vehicle 2 is notified from the vehicle speed pulse detector 33 to the control section 25 similarly to a case of the first embodiment. Furthermore, the fuel meter 35 is connected to the control section 25 via the A/D converter 34; thus, the control section 25 confirms how much fuel is consumed.

The control section 25 calculates the used charge according to the driving distance which is calculated based on the motor vehicle pulse which is detected in the vehicle speed pulse detector 33 and the used fuel amount which is calculated according to the fuel meter 35 with reference to the charge list 42. Consequently, the control section 25 transmits the calculated used charge together with the ID number of the motor vehicle which is stored in the information storing device 32 and the ID number and the PIN for the user which are inputted by the user in to the control center 1. The control center 1 records these information as a rental record.

Next, an operation in the motor vehicle sharing system according to the present embodiment is explained with reference to drawings.

FIGS. 13, 14, 15, 16, 17, and 18 are flow charts showing an entire process flow in the motor vehicle sharing system.

The user 4 who is registered as a membership in the control center 1 owns a smart card 5; thus, the user 4 can use the shared motor vehicle 2.

The control section 25 in the shared motor vehicle 2 judges whether or not there is a data in the card reader 24 (step S1) so as to know whether or not the master card 5 which is owned by the user 4 accesses the shared motor vehicle 2. After that, the control section 25 awaits the access of the user 4 by the smart card 5 to the shared motor vehicle 2 (NO in step S1).

In the step S1, when the user 4 accesses the shared motor vehicle 2 by the smart card 5 (YES in step S1), the control section 25 in the shared motor vehicle 2 reads out the membership ID which is recorded in the smart card 5 by the card reader 24 (step S2) and searches in the membership list 40 according to the received membership ID (step S3), and judges whether or not the membership ID indicates an authorized user (step S4).

In the step S4, if the received membership ID indicates an authorized user (YES in the step S4), the control section 25 in the shared motor vehicle 2 outputs the doorlock signal to the door lock structure 26 (step S5) and displays the PIN inputting screen on the monitor display section 28 (step S6).

Also, in the step S4, if the received membership ID does not indicate the authorized user (NO in the step of S4), the flow chart returns to the step S1; thus, the control section 25 in the shared motor vehicle 2 repeats the above operation and does not rent the shared motor vehicle 2. Here, in case of a double-booked rental according to the received membership ID, the shared motor vehicle 2 is not rented.

Next, whether or not the PIN is inputted is judged (step S7), and it is awaited until the PIN is inputted (NO in the step of S7).

In the step S7, when the user 4 inputs the PIN from the operation section 29 (YES in the step S7), the inputted PIN is given to the user 4 in advance. Consequently, whether or not the PIN which is given to the user in advance coincides with the PIN which is recorded in the membership list 26 transmitted from the control center 1 is judged (step S8).

In the step S8, when the inputted PIN is given to the user 4 in advance, and the PIN which is given to the user 4 in advance does not coincide with the PIN which is recorded in the membership list 40 (NO in the step S8), the flow chart returns to the step S1 and the above operation is repeated.

Also, in the step S8, when the inputted PIN is given to the user 4 in advance and the inputted PIN which is given to the user 4 in advance coincides with the PIN which is recorded in the membership list 40 (YES in the step S8), the rental time, the vehicle speed pulse counter, and the fuel amount at the rented time are set (step S9). Here, condition is such as "rental time=present time", "vehicle speed counter=reset", and "fuel at rented time=present value in the fuel meter".

After each item is set, the control section 25 in the shared motor vehicle 2 outputs an engine start permission signal to the main power supply control section 27 (step S10).

Next, the control section 25 in the shared motor vehicle 2 judges whether or not the parking area detection by an antenna 36 for tag and an ID tag reader 37 is turned off (step S11) so as to judge whether or not the user 4 turns on the ignition of the shared motor vehicle 2 so as to start using the shared motor vehicle 2 and awaits until the shared motor vehicle 2 leaves from the lot 51 in the port 50 in the departing place and it is not possible to detect the ID tag 52 (NO in the step of S11).

In the step S11, when the shared motor vehicle 2 leaves from the lot 51 in the port 50 in the departing place and it is not possible to detect the ID tag 52, the parking area detection by an antenna 36 for tag and an ID tag reader 37 is turned off (YES in the step S11); thus, the shared motor vehicle 2 starts driving. During the shared motor vehicle 2 is driving, the motor vehicle speed pulse is always notified to the control section 25 in the shared motor vehicle 2 by the vehicle speed pulse detector 33. The control section 25 calculates the notified motor vehicle speed pulse so as to measure the driving distance of the shared motor vehicle 2 (step S12).

Next, the control section 25 in the shared motor vehicle 2 judges whether or not the parking area detection by the antenna 36 for the tag and the ID tag reader 37 is turned on (step S13) so as to know whether or not the shared motor vehicle 2 arrives at the lot 51 in the port 50 in the destination place. Consequently, the control section 25 awaits until the shared motor vehicle 2 arrives at the lot 51 in the port 50 in the destination place such that it is possible to detect the ID tag 52 (NO in the step of S13).

In the step S13, when the shared motor vehicle 2 arrives at the lot 51 in the port 50 in the destination place and it is possible to detect the ID tag 52, the parking area detection by the antenna 36 for tag and the ID tag reader 37 is turned on (YES in the step S13) and the control section 25 in the shared motor vehicle 2 turns on the lamp which indicates "rentable" on the return button 31 (step S14).

Consequently, whether or not the return button 31 is turned on (step S15), and it is awaited that the user 4 turns on the return button 31 so as to return the shared motor vehicle 2 (NO in the step of S15).

In the step S15, when the user 4 turns on the return button 31 and returns the shared motor vehicle 2 (YES in the step S15), the control section 25 in the shared motor vehicle 2 sets the returned time, the motor vehicle speed pulse counter, and the fuel amount at the returned time (step S16). Here, the condition is such as "return time=present time", "vehicle speed counter=reset", and "fuel at returned time=present value in the fuel meter".

After each item is set, the control section 25 in the shared motor vehicle 2 calculates the driving distance, the usage time, and the used fuel amount (step S17) and calculates the used charge based on these information with reference to the charge list 42 (step S18).

Consequently, the control section 25 in the shared motor vehicle 2 displays the calculated price data on the monitor display section 28 (step S19).

Next, the control section 25 in the shared motor vehicle 2 judges whether or not there is a data in the card reader 24 (step S20) so as to judge whether or not the user 4 is accessing to the shared motor vehicle 2 by the smart card 5 and awaits until the user 4 leaves the shared motor vehicle 2 together with the smart card 5 (YES in the step S20).

In the step S20, when the user 4 leaves the shared motor vehicle 2 together with the smart card 5 (NO in the step of S20), the control section 25 in the shared motor vehicle 2 outputs the door lock signal to the door lock structure (step S21) and transmits a return completion signal to the control center 1 via the communication device 22 and the communication antenna 21 (step S22). Here, it is understood that the return completion signal contains the membership ID of the user 4 who uses the shared motor vehicle 2, the rented date and time, the return date and time, the usage time, the driving distance, the consumed amount of the fuel in the shared motor vehicle 2.

On the other hand, the control section 11 in the control center 1 judges whether or not there is a received data in the communication device 17 (step S23) so as to know whether or not the return completion signal is transmitted from the shared motor vehicle 2, and awaits until the return completion signal is transmitted from the shared motor vehicle 2 (NO in the step of S23).

In the step S23, when the return completion signal is transmitted from the shared motor vehicle 2 (YES in the step S23), the control section 11 in the control center 1 writes the membership ID of the user 4 who uses the shared motor vehicle 2, the rented date and time, the return date and time, the usage time, the driving distance, the consumed amount of the fuel in the shared motor vehicle 2 in the rental list which is recorded in the rental record 16 (step S24).

Next, the control section 11 in the control center 1 judges whether or not a periodical accounting process such as a monthly accounting process is performed (step S25). When the periodical accounting process is performed (YES in the step S25), a used charge is charged to a designated bank account of the user in the financial corporation 3 based on the membership master 12 and the record in the rental record 16 via the adjustment processing section 18 (step S26).

Also, the control section 11 in the control center 1 updates the membership list which is recorded in the membership master 12 (step S27) and transmits the membership list which is recorded in the membership master 12 to the shared motor vehicle 2 via the communication device 17 (step S28).

On the other hand, the control section 25 in the shared motor vehicle 2 judges whether or not there is a received data in the communication device 22 (step S29) so as to know whether or not the membership list in the membership master 12 which is updated by the control center 1 is transmitted, and awaits until the membership list in the membership master 12 which is updated by the control center 1 is transmitted (step S30).

In the step S30, when the membership list of the updated membership master 12 is transmitted from the control center 1 (YES in the step S30), the control section 25 in the shared motor vehicle 2 updates a content in the membership list 26 to be a content in the received membership list (step S31).

Here, in the above embodiment, explanations are made the content in the membership list 40 in the shared motor vehicle 2 is updated based on the membership master 12 in the control center 1 every time the shared motor vehicle 2 is used for example, in the step S31. However, it may acceptable when the such an updating operation is performed periodically in the accounting operation in, for example, the step S26. Furthermore, in the steps S3 and S4, when the membership ID of the user 4 who wishes using the shared motor vehicle 2 is not recorded in the membership list 40 (NO in the step of S4), it may be acceptable that a request for updating the membership list 40 is sent to the control center 1 so as to always operate the motor vehicle rental business based on the latest data.

INDUSTRIAL APPLICABILITY

As explained above, according to the present invention, even when a communication between the control center and the motor vehicle is disrupted, a motor vehicle uses a detector so as to detect a start of the motor vehicle rental and an end of the motor vehicle rental. In particular, according to a first aspect of the present invention, the motor vehicle detects a parking position of the motor vehicle itself by using a parking position detector; therefore, it is possible to record the usage information of the motor vehicle by a user accurately by acknowledging a start and an end of the rental of the motor vehicle and by measuring the usage information which relates to the used charge of the motor vehicle according to the acknowledged information regarding the start and the end of the rental of the motor vehicle. Therefore, the user can return the motor vehicle reliably, and the motor vehicle can perform a billing process in the control center.

Also, it is confirmed that a communication between the control center and the motor vehicle is possible by the communication confirming section and a usage information of the motor vehicle is transmitted to the control center when a communication is possible with regardless to a timing of returning a motor vehicle. Therefore, it is possible to solve conventional problems that the user can not return the motor vehicle because a communication between the motor vehicle and the control center is disrupted and the control center cannot perform a billing process to the usage of the motor vehicle.

Also, according to a second aspect of the present invention, the motor vehicle itself is provided with a membership list of the users and a usage charge list of the motor vehicle. Also, whether the user who wishes using the motor vehicle is an authorized user is judged and the motor vehicle itself performs a calculation for a used charge to the usage of the motor vehicle. Thus, the motor vehicle itself performs processes for a motor vehicle rental and a motor vehicle return. Therefore, it is possible to solve conventional problems that the user can not rent nor return the motor vehicle because a communication between the motor vehicle and the control center is disrupted and the control center cannot perform a billing process to the usage of the motor vehicle.

Also, it is not necessary for the control center to communicate with the motor vehicle every time the user uses the motor vehicle. Also, it is not necessary to judge whether the user is an authorized user is judged. Therefore, it is possible to reduce an information processing amount for a lot of the motor vehicle; thus, it is possible to reduce cost for a new investment for a facility which is necessary for the control center because the information processing role is distributed in the motor vehicles themselves.

What is claimed:

1. A motor vehicle sharing system for managing motor vehicles parked in a parking area and renting the motor vehicles to users wherein the motor vehicle is provided with:
    a detector for detecting a start of motor vehicle rental when a motor vehicle rental is permitted to a user and end of the motor vehicle rental;
    a usage data measuring section for starting a measurement for a motor vehicle usage data when the detector detects a start of the motor vehicle rental and completing the measurement for the motor vehicle usage data when the detector detects an end of the motor vehicle rental;
    a communication confirming section for confirming whether or not it is possible to communicate to a control center when the usage data measuring section completes measuring the motor vehicle usage data; and
    a temporary data storing and transmitting section for transmitting the motor vehicle usage data to the control center when the communication confirming section judges that it is possible to communicate with the control center, storing temporarily the motor vehicle usage data in a data storing section when the communication confirming section judges that it is not possible to communicate with the control center, and transmitting the motor vehicle usage data to the control center after it is possible to communicate with the control center.

2. A motor vehicle sharing system according to claim 1 wherein:
    the detector includes a position detector for detecting a parking area
    the usage data measuring section starts measuring the motor vehicle usage data when the usage data measuring section detects a departure of the position detector from the parking area; and
    the usage data measuring section completes measuring the motor vehicle usage data when the usage data measuring section detects an arrival of the position detector at the parking area.

3. A motor vehicle sharing system according to claim 1 or 2 wherein:
    the position detector contains a receiver which receives a signal which is made in a signal generator which is disposed in the parking area; and the position detector judges whether a motor vehicle departs the parking area or arrives at the parking area according to whether or not there is a signal arrived in the receiver.

4. A motor vehicle sharing system according to claim 3 wherein the control center performs calculation process for a used charge according to the motor vehicle usage data.

5. A motor vehicle sharing system according to claim 3 wherein the motor vehicle usage data contains at least a usage time of the motor vehicle, a used fuel amount in the motor vehicle, and a driving distance of the motor vehicle.

6. A motor vehicle sharing system according to claim 1 or 2 wherein the position detector judges whether a motor vehicle departs the parking area or arrives at the parking area according to a GPS (Global Positioning System).

7. A motor vehicle sharing system according to claim 6 wherein the control center performs calculation process for a used charge according to the motor vehicle usage data.

8. A motor vehicle sharing system according to claim 6 wherein the motor vehicle usage data contains at least a usage time of the motor vehicle, a used fuel amount in the motor vehicle, and a driving distance of the motor vehicle.

9. A motor vehicle sharing system according to claim 1 or 2 wherein the control center performs calculation process for a used charge according to the motor vehicle usage data.

10. A motor vehicle sharing system according to claim 9 wherein the motor vehicle usage data contains at least a usage time of the motor vehicle, a used fuel amount in the motor vehicle, and a driving distance of the motor vehicle.

11. A motor vehicle sharing system according to claim 1 or 2 wherein the motor vehicle usage data contains at least a usage time of the motor vehicle, a used fuel amount in the motor vehicle, and a driving distance of the motor vehicle.

12. A motor vehicle sharing system according to claim 1 wherein the motor vehicle is further provided with:
   a membership list in which information of users who can use motor vehicle motors;
   a charge list on which a relationship of the motor vehicle usage data which relates to a motor vehicle rental and return and the used charge for the motor vehicle is recorded;
   a rentability judging section for judging whether or not the motor vehicle is rentable to the user by referring the information which is inputted by the user when the motor vehicle is rented with records in the membership list;
   a charging data generating section for making a charging data of the user by referring the motor vehicle usage data which is measured during the rental of the motor vehicle and the return of the motor vehicle by the usage data measuring section to the records in the charge list.

13. A motor vehicle sharing system according to claim 12 further comprising a control center which transmits and receives a charging data with a vehicle wherein:
   the motor vehicle is provided with a transmitter which transmits a charging data to the control center; and
   the control center is provided with a charge billing section which calculates a used charge according to the charging data for a predetermined period and bills the used charge to the user.

14. A motor vehicle sharing system according to claim 12 or 13 wherein:
   the control center has a master membership list which contains a latest data of users who can use motor vehicles; and
   the motor vehicle obtains the master membership list from the control center every time the user uses the motor vehicle and updates the membership list.

15. A motor vehicle sharing system according to claim 14 further comprising a position detector for detecting the parking area wherein
   the usage data measuring section starts measuring the motor vehicle usage data when a departure of the position detector from the parking area is detected; and
   the usage data measuring section completes measuring the motor vehicle usage data when an arrival of the position detector at the parking area is detected.

16. A motor vehicle sharing system according to claim 14 wherein the motor vehicle usage data contains at least a usage time of the motor vehicle, a used fuel amount of the motor vehicle, or a driving distance of the motor vehicle.

17. A motor vehicle sharing system according to claim 12 or 13 wherein:
   the control center has the master membership list which contains a latest data of users who can use motor vehicles; and
   the motor vehicle obtains the master membership list from the control center periodically and updates the membership list.

18. A motor vehicle sharing system according to claim 17 further comprising a position detector for detecting the parking area wherein:
   the usage data measuring section starts measuring the motor vehicle usage data when a departure of the position detector from the parking area is detected; and
   the usage data measuring section completes measuring the motor vehicle usage data when an arrival of the position detector at the parking area is detected.

19. A motor vehicle sharing system according to claim 17 wherein the motor vehicle usage data contains at least a usage time of the motor vehicle, a used fuel amount of the motor vehicle, or a driving distance of the motor vehicle.

20. A motor vehicle sharing system according to claim 12 or 13 wherein:
   the control center has the master membership list which contains a latest data of users who can use motor vehicles; and
   the motor vehicle obtains the master membership list from the control center and updates the membership list when an information which is inputted by the user is not recorded in the membership list.

21. A motor vehicle sharing system according to claim 20 further comprising a position detector for detecting the parking area wherein
   the usage data measuring section starts measuring the motor vehicle usage data when a departure of the position detector from the parking area is detected; and
   the usage data measuring section completes measuring the motor vehicle usage data when an arrival of the position detector at the parking area is detected.

22. A motor vehicle sharing system according to claim 20 wherein the motor vehicle usage data contains at least a usage time of the motor vehicle, a used fuel amount of the motor vehicle, or a driving distance of the motor vehicle.

23. A motor vehicle sharing system according to claim 12 or 13 further comprising a position detector for detecting the parking area wherein:
   the usage data measuring section starts measuring the motor vehicle usage data when a departure of the position detector from the parking area is detected; and the usage data measuring section completes measuring the motor vehicle usage data when an arrival of the position detector at the parking area is detected.

24. A motor vehicle sharing system according to claim 23 wherein the motor vehicle usage data contains at least a usage time of the motor vehicle, a used fuel amount of the motor vehicle, or a driving distance of the motor vehicle.

25. A motor vehicle sharing system according to claim 12 or 13 wherein the motor vehicle usage data contains at least a usage time of the motor vehicle, a used fuel amount of the motor vehicle, or a driving distance of the motor vehicle.

* * * * *